US012633850B2

(12) United States Patent
Driscoll, Jr. et al.

(10) Patent No.: US 12,633,850 B2
(45) Date of Patent: May 19, 2026

(54) DIAPHRAGM PUMP CONTROL FOR AIRBED APPLICATIONS

(71) Applicant: Sizewise Rentals L.L.C., Eden Prairie, MN (US)

(72) Inventors: David Delroy Driscoll, Jr., Milwaukee, WI (US); James A. Rodrain, Milwaukee, WI (US); David Brian Scott, New London, NC (US)

(73) Assignee: Sizewise Rentals L.L.C., Eden Prairie, MN (US)

( * ) Notice: Subject to any disclaimer, the term of this patent is extended or adjusted under 35 U.S.C. 154(b) by 33 days.

(21) Appl. No.: 18/920,642

(22) Filed: Oct. 18, 2024

(65) Prior Publication Data

US 2025/0132705 A1     Apr. 24, 2025

Related U.S. Application Data

(60) Provisional application No. 63/591,324, filed on Oct. 18, 2023.

(51) Int. Cl.
H02P 7/29 (2016.01)
A47C 27/08 (2006.01)
(Continued)

(52) U.S. Cl.
CPC .............. H02P 7/04 (2016.02); A47C 27/082 (2013.01); A47C 27/083 (2013.01); F04B 43/04 (2013.01);
(Continued)

(58) Field of Classification Search
CPC ... A47C 27/081; A47C 27/082; A47C 27/083; F04B 2203/0402; F04B 35/04;
(Continued)

(56) References Cited

U.S. PATENT DOCUMENTS

| | | | | |
|---|---|---|---|---|
| 10,090,777 B2 * | 10/2018 | Dent | ..................... | H02J 7/0068 |
| 2003/0228021 A1 * | 12/2003 | Letinturier | ............ | B60R 25/104 |
| | | | | 381/86 |

(Continued)

FOREIGN PATENT DOCUMENTS

| | | |
|---|---|---|
| CN | 115955087 A | 4/2023 |
| JP | 4768240 B | 9/2011 |

(Continued)

OTHER PUBLICATIONS

International Search Report and Written Opinion Issued in PCT/US2024/052095 Jan. 8, 2025.

*Primary Examiner* — Dominick L Plakkoottam
(74) *Attorney, Agent, or Firm* — Spencer Fane LLP

(57) ABSTRACT

An air pump unit having an AC diaphragm air pump and a DC Motor driver circuit. The AC diaphragm air pump has a winding with a first AC power connection at a first end of the winding and a second AC power connection at a second end of the winding. The DC motor driver circuit is configured to provide an OUT1 signal to the first AC power connection and an OUT2 signal to the second AC power connection. The OUT1 and OUT2 signals are each DC square waveforms having a frequency that corresponds to a motor frequency setting. Each of the OUT1 and OUT2 DC square waveforms are 180 degrees out of phase.

20 Claims, 11 Drawing Sheets

(51) Int. Cl.

| | |
|---|---|
| *F04B 43/04* | (2006.01) |
| *F04B 49/06* | (2006.01) |
| *H02P 7/03* | (2016.01) |
| *H02P 25/06* | (2016.01) |

(52) U.S. Cl.
CPC ............... *F04B 49/06* (2013.01); *H02P 7/29* (2013.01); *H02P 25/06* (2013.01)

(58) Field of Classification Search
CPC ...... F04B 35/045; F04B 49/06; F04B 49/065; F04B 45/047; F04B 43/04; H02K 7/14; H02P 25/06; H02P 27/06; H02P 27/08; H02P 7/04; H02P 7/29
See application file for complete search history.

(56) References Cited

U.S. PATENT DOCUMENTS

| | | | | |
|---|---|---|---|---|
| 2018/0091123 | A1* | 3/2018 | Park | H03K 3/80 |
| 2021/0076834 | A1* | 3/2021 | Driscoll | A47C 27/082 |
| 2023/0155482 | A1* | 5/2023 | Dent | H02J 3/00 |
| | | | | 307/77 |
| 2025/0055399 | A1* | 2/2025 | Scolan | F04B 49/06 |

FOREIGN PATENT DOCUMENTS

| | | |
|---|---|---|
| JP | 2015155656 A | 8/2015 |
| JP | 2015155657 A | 8/2015 |

* cited by examiner

DIAPHRAGM PUMP CONTROL FOR AIRBED APPLICATIONS

REFERENCE TO RELATED APPLICATION

This application claims priority to Provisional Application No. 63/591,324, filed Oct. 18, 2023, the contents of which are incorporated herein by reference.

TECHNICAL FIELD

This disclosure relates to diaphragm pumps used in airbed or air mattress applications. More specifically, this disclosure relates to electromagnetic diaphragm air pumps and control signals that control such pumps.

BACKGROUND

Conventional home-use and medical-use airbeds generally include at least a few main components such as 1) a mattress with at least one chamber or bladder that can be filled with air, 2) an air pump unit for pumping air into the chamber, and 3) appropriate connections between the mattress and the air pump unit. The air pump unit may further include a controller and an air pump. Presently, conventional air pumps used in airbeds are "squirrel-cage" blowers and diaphragm pumps.

Squirrel-cage blowers used in airbeds are relatively simple and inexpensive pumps that rely on a fan to push air into one or more chambers of the air mattress. While squirrel-cage blowers can achieve a relatively high flow rate (e.g., around 75 L/min) and inflate a mattress relatively quickly, they are unable to produce internal mattress air pressures high enough to meet desirable pressure ranges needed for most of the home-use and medical-use airbeds of at least 1 psi. Squirrel-cage blowers are generally limited to producing inflated air-mattress pressures of up to about 0.1-0.5 psi. Squirrel-cage blowers also tend to be energy inefficient and thus generate higher levels of heat while operating as compared to diaphragm pumps.

Diaphragm pumps are a type of positive displacement (PD) pump. A PD pump moves air (or other fluids) by repeatedly enclosing a fixed volume of air and then moving the air mechanically through the pump's system. The PD's pumping action is cyclic and can be driven by pistons, screws, gears, rollers, diaphragms, or vanes. More specifically, diaphragm air pumps used in home-use and medical-use airbeds are often a type of reciprocating positive displacement (RPD) pump that operate by repeated back-and-forth movements (i.e., strokes) of a piston, plunger, or diaphragm. RPD pumps can fill or inflate a chamber or bladder with air to pressures greater than 3 psi and, depending on the specific RPD pump design, up to hundreds of psi.

Diaphragm RPD pumps can fill or inflate a chamber or bladder of a home-use or medical-use airbed to pressures of up to and exceeding 5 psi-125 psi (or 8.6 bar), which is well beyond the general requirements of the airbed industry. However, at low pressure ranges of less than 0.5 psi, diaphragm RPD pumps are generally not capable of providing as much air flow as squirrel-cage blowers and thus take more time to initially fill an air mattress. Additionally, diaphragm RPD pumps, for the same relative performance as a squirrel-cage blower at low pressure ranges, are more expensive.

However, the ability of diaphragm RPD pumps to outperform squirrel-cage blowers at providing higher useful inflation pressures and variable flow rates that are controllable over the a majority of the diaphragm RPD pump's inflation pressure range makes diaphragm RPD pumps a good choice for providing inflation air input in home-use and medical-use air mattress systems that include desired features such as slow air loss, pulsation, auto immersion, choices of alternating pressure settings, turn assist, or continuous lateral rotation functionalities.

One problem with existing diaphragm RPD pumps is that for an existing diaphragm RPD pump's specified AC input voltage and current consumption, the pump's air flow output is considered inefficient, not easily controllable, and may be wasting valuable energy in the form of heat or other inefficiencies.

Another drawback of existing diaphragm RPD pumps used in home-use and medical-use air mattress systems is that they are somewhat noisy (dBs), especially as the reciprocating motor within the pump is operated at higher reciprocating or oscillating frequencies. These diaphragm RPD pump devices are incorporated in air bed mattress systems used by consumers or patients to rest, sleep, heal, or as a place to get better after an operation, medical procedure, or injury. The quieter the mattress air pump operates, the better for the patient or ultimate user(s) of the home-use or medical-use air mattress and associated controller device.

SUMMARY

This disclosure provides embodiments of an air bed system having an air mattress adapted to have at least one chamber filled with air. A manifold is configured to connect to the air mattress and provide air to the at least one chamber. An AC diaphragm air pump having at least one air out output is connected to the manifold to provide airflow to the manifold. The AC diaphragm air pump is a reciprocating positive displacement (RPD) pump that includes an electromagnetic motor that includes at least one winding, and at least one diaphragm connected to an oscillating part of the electromagnetic motor, and to an air chamber such that oscillation of the oscillating part moves the diaphragm in first and second directions to pump air through the air chamber and out the at least one output. The AC diaphragm pump further includes a first and a second AC power connection wherein the first AC power connection is electrically connected to a first side of the winding and the second AC power connection is electrically connected to a second side of the winding. The air bed system further comprises a main controller configured to control at least one function of the of the air bed system. The main controller is configured to control an air pumping function of the AC diaphragm air pump. The main controller includes a DC motor driver circuit configured to provide an OUT1 signal to the first AC power connection of the AC diaphragm pump and to provide an OUT2 signal to the second AC power connection of the AC diaphragm pump. The OUT1 and OUT2 signals are each DC square waveforms having a frequency that corresponds to a motor frequency setting. Furthermore, each of the OUT1 and OUT2 waveforms are 180 degrees out of phase. The DC motor driver circuit further includes an OUT1 and OUT2 current limiting circuit that limits the current provided by the OUT1 and OUT2 signals to the winding to be less than an absolute value of a +/−Max current setting. The OUT1 and OUT2 current limiting circuitry is configured to regulate the current provided by the OUT1 and OUT2 signals by chopping the respective OUT1 or OUT2 signal that is providing current to the winding that is greater than or equal to the absolute value of the +/−Max current setting.

In another embodiment, the main controller further includes a microcontroller, The microcontroller is configured to provide a +/−Max current setting signal to the DC motor driver circuit to set the +/−Max current setting. The microcontroller is further configured to provide a motor frequency signal to the DC motor driver circuit to set the motor frequency setting to a selected frequency.

Before undertaking the DETAILED DESCRIPTION below, it may be advantageous to read and understand the set forth definitions of certain words and phrases that may be used throughout this patent document. The term "couple," "coupled with/to," or "connected with/to" and derivatives thereof refer to any direct or indirect or via another element connection or communication between two or more elements, whether or not those elements are in physical or direct contact with one another. In contrast, the term "directly coupled with/to," or "directly connected with/to" and their derivatives means that no other element intervenes between the connection or coupling of the two elements. The terms "transmit," "receive," and "communicate," as well as derivatives thereof, encompass both direct and indirect communication. The terms "include" and "comprise," as well as their derivatives, mean inclusion without limitation. The term "or" is inclusive, meaning and/or. The phrase "associated with," as well as derivatives thereof means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

The term "controller" means any device, system, or part thereof that controls at least one operation. Such a controller may be implemented in hardware or a combination of hardware and software and/or firmware. The functionality associated with any controller may be centralized or distributed, whether locally or remotely.

As used herein, the terms "configured (or set) to" may be interchangeably used with the terms "suitable for," "having the capacity to," "designed to," "adapted to," "made to," or "capable of," depending on circumstances. The term "configured (or set) to" does not essentially mean "specifically designed in hardware to." Rather, the term "configured to" may mean that a device can perform an operation together with another device or parts. For example, the term "microprocessor configured (or set) to perform A, B, and C may mean a generic-purpose processor (e.g., a CPU, application processor, microprocessor, embedded processor, or microcontroller) that may perform the operation(s) by executing one or more software programs stored in a memory device or a dedicated processor (e.g., an embedded processor) for performing the operation. Note an embedded processor is often considered synonymous with a microcontroller and refers to a type of microprocessor that is designed into a system to control electrical and mechanical functions. Embedded processors are usually simple in design, limited to computational power and input/output (I/O) capabilities and may have minimal power requirements. Embedded processor may be configured to monitor specified input signal and provide specified output signals that may or may not be based on one or more received input signal. At a basic level, embedded processors are a CPU chip placed in a system that it helps control.

Various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer or processor, such as read only memory (ROM), random access memory (RAM), a hard disk drive, a flash drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as rewritable optical disc or an erasable memory device.

As used herein, the terms "have," "may have," "include," "may include," "can have," or "can include" a feature (e.g., a number, function, operation, or component such as a part) in their derivations indicate the existence of the feature and do not exclude the existence of other features.

As use herein, the terms "A or B," "at least one of A and/or B," or "one or more of A and/or B" may include all possible combinations of A and B. For example, "A or B," "at least one of A and B," "at least one of A or B," may indicate all of (1) including at least one A, (2) including at least B, or (3) including at least one A and at least one B.

Additionally, to help with clarity, the phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

As used herein, the terms "first," or "1st," and "second," or "2nd," may modify various components regardless of importance or order, and do not limit the components. These terms are only used to distinguish one component from another. For example, a 1st user device and a 2nd user device may indicate different devices from each other regardless of the order or importance of the devices. For example, a first component may be denoted a second component, and vice versa without departing from the scope of the present disclosure.

The terms as used herein are provided merely to describe embodiments thereof, but not to limit the scope of other embodiments of the present disclosure. It is to be understood that singular forms "a," "an," and "the" include plural references unless the context clearly dictates otherwise. All terms, including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

As used herein, the term "user" may denote a human.

Definitions for other certain words and phrases are provided throughout this patent document. Those of ordinary skill in the art should understand that in many if not most instances, such definitions apply to prior as well as future uses of such defined words and phrases in this patent document.

DETAILED DESCRIPTION

Figure 1:
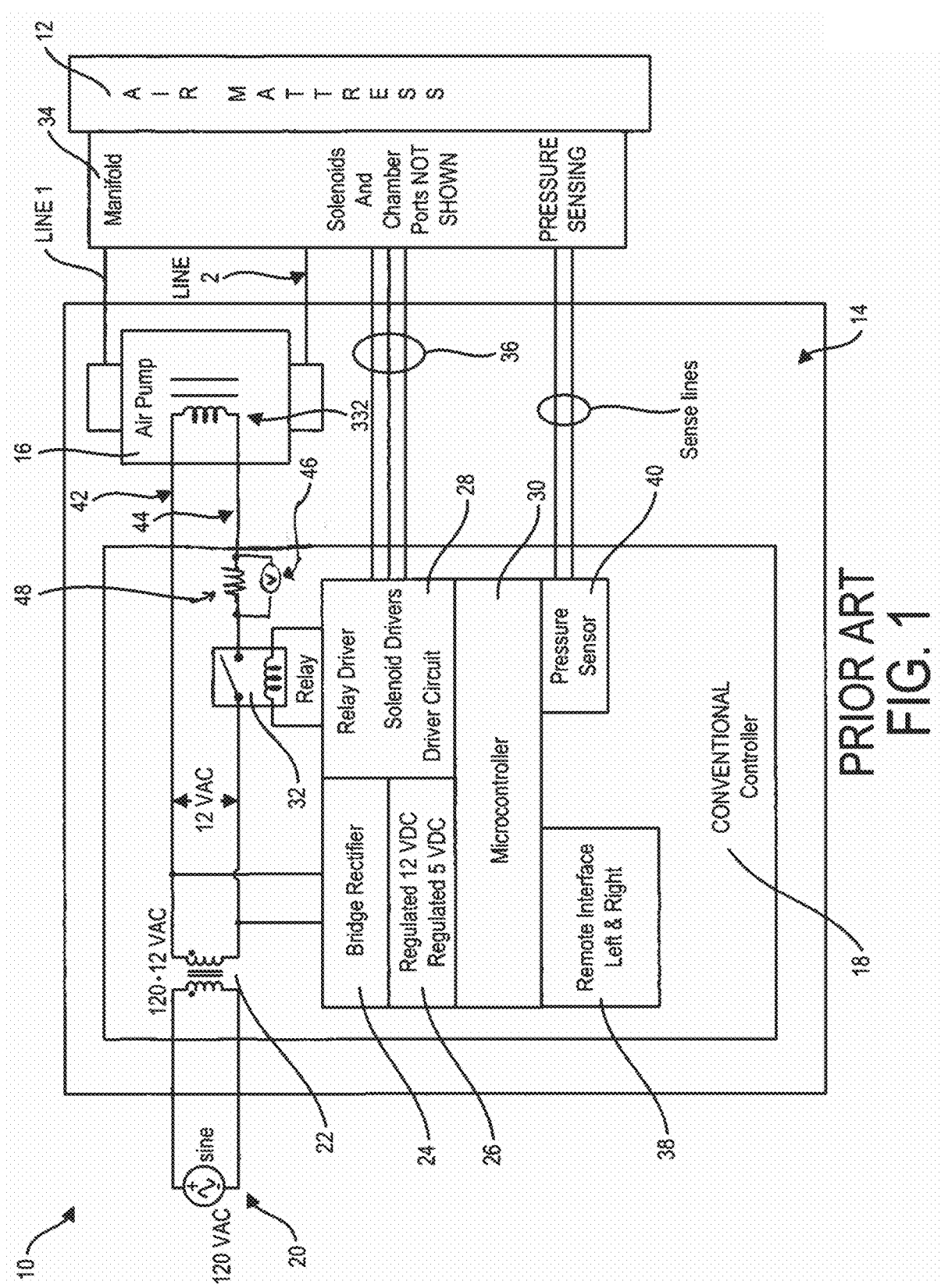
FIG. 1 is an example block diagram schematic illustrating components of a prior conventional home-use or medical-use air bed.

FIGS. 1 through 8, discussed below, and the various example embodiments used to describe the principles of this disclosure in this patent document are by way of illustration only and should not be construed in any way to limit the scope of the disclosure. Those skilled in the art will understand that the principles of the disclosure may be implemented in any suitably arranged home-use or medical-use airbed, or any suitably arranged air pump unit.

Various inventive principles discussed herein are discussed in the context of examples of diaphragm pump configurations, but it will be appreciated that the inventive principles are applicable to both single- and double-sided positive displacement electromagnetic diaphragm pumps used in air bed environments or in other environments. Such electromagnetic diaphragm pumps include diaphragm pumps that have an electromagnet that drives a proximately located rod, having permanent magnets attached thereto, to oscillate back and forth in a manner such that the rod moves at least one diaphragm attached to an end of the rod to reciprocate back and forth and move the air through the pump. Other embodiments may include various types of electromagnetic motor driven oscillating diaphragm pumps.

In embodiments of the invention, two square waveforms or pseudo square waveforms are provided to two inputs (i.e., the AC power connections) of an AC diaphragm air pump. Instead of powering an AC diaphragm air pump from a conventional AC power source, embodiments of the disclosure power the AC diaphragm air pump by separately connecting two square or pseudo square waveforms having a phase difference of 180 degrees. Testing has shown that use of two 180 degree out of phase square wave or pseudo square waveform inputs, connected respectively to a 1$^{st}$ and 2$^{nd}$ AC input connection of the AC diaphragm air pump, create a significant increase in air flow provided by the AC diaphragm air pump when compared with the use of conventional 50 or 60 Hz AC sine wave line power or similar waveforms used in conventional diaphragm air pump units.

Additionally, in various embodiments it was found that adjustments to the frequency of the two 180° out of phase square waveform inputs can tune the square waveform frequency to the diaphragm pump's physical parameters to further increase or maximize air flow output of the diaphragm pump. Further embodiments can include additional refined control over the diaphragm pump. The additional refined control of the diaphragm air pump includes coupling feedback signals from pressure sensors associated with the air mattress to the controller. Refined control can also include providing sound or a dB related feedback signal to the microcontroller to aid in tuning the two 180° DC out of phase DC square waveforms' frequencies, Max voltage, and +/−Max current in order to decrease or minimize the audible sound (dB) of the AC diaphragm air pump while operating at a selected oscillation frequency. In various embodiments, parameters that may be adjusted include the DC square waveform voltage magnitudes, the DC square waveform maximum current, with the square waveform frequencies.

FIG. 1 illustrates an example schematic illustrating components of a conventional prior art home-use or medical-use airbed system (hereinafter "conventional air bed") 10. The conventional airbed 10 includes an air mattress 12 having at least one chamber or bladder that can be filled with air (not specifically shown). The conventional airbed system 10 further includes an air pump unit 14, which operates to control the ON and OFF functionality of pumping air via a diaphragm air pump 16 into the air mattress 12 using a provided unregulated fixed AC sinusoidal voltage provided. The air pump unit 14 may include or be associated with the diaphragm air pump 16 and a conventional controller circuit 18.

In this example block diagram schematic of a conventional airbed system 10, a conventional controller 18 is adapted to connect or couple to AC power 20. The AC power 20 may be, for example, from a conventional wall outlet or and AC line power source that provides between 110 and 240 volts AC. In FIG. 1, the AC power 20 provided to the air pump unit 14 and conventional controller 18 provides 120 volts AC at a frequency of about 60 Hz. The AC power, because it is provided from a line AC power source, is unregulated and known to have its AC (RMS) voltage of 120 VAC fluctuate or vary by about +10% to −15%. A transformer 22 or other similarly functioning circuit is used in this conventional controller eighteen to transform or reduce the coupled AC 120 VAC voltage from the AC power 20 to 12 VAC. The resulting 12 VAC will fluctuate about the same percentage as the 120 VAC line voltage.

The 12 VAC voltage is rectified by a bridge rectifier circuit 24 to produce an unregulated DC voltage. The unregulated DC voltage is coupled to a DC voltage regulator circuit 26. The DC voltage regulator circuit 26 converts the unregulated DC voltage to a plurality of regulated DC voltages for use by circuitry in or associated with the conventional controller 18. The DC regulator circuit 26 can also provide regulated 12 VDC and regulated 5 VDC for use by other circuitry and logic circuits in or associated with the air pump unit 14.

Driver circuitry 28 includes one or more relay driver circuits and solenoid driver circuits. A relay driver circuit (not specifically shown in the driver circuitry 28) is coupled via low voltage circuitry or signal lines to the microcontroller 30. The relay driver circuit is configured to enable the microcontroller 30 to open and close an AC power relay 32, which toggles the 12 VAC power from the transformer 22 on and off and effectively turns the diaphragm air pump 16 on and off. Note that the diaphragm air pump 16 only has on/off control. There is no ability to tune the 12 volt AC frequency to physical features of the diaphragm air pump 16 or to adjust the 60 Hz sinusoidal frequency provided to the diaphragm air pump 16 to a different frequency or waveform that may increase the energy efficiency, modify the air throughput or pressure, or decrease the overall sound of the diaphragm air pump 16. There is also no ability to variably control or limit the current flow through the AC diaphragm air pump 16.

It is well known that under certain conditions an AC oscillating motor, such as the types used in diaphragm air pumps will overheat and fail due to drawing too much current from its power source. Also, since the AC power 20 that is transformed to 12 VAC by the transformer 22 is provided to the diaphragm air pump 16, then the AC diaphragm air pump 16 will have unwanted variations in pump airflow output and pump noise, due to there being no ability to regulate the 12 VAC power from fluctuations of between about +10% to −15%. A drawback of the air bed system 10 of FIG. 1 is that there is no ability, control, or means to affect a user or device implementation of an increase or decrease of the airflow through, the output pressure of, or the control of unwanted or extra noise generated by the AC diaphragm pump 16.

The solenoid driver circuitry (not specifically shown in the driver circuitry 28), is coupled to receive low voltage solenoid control signals from a microcontroller 30. The solenoid control signals enable the microcontroller thirty to instruct the solenoid driver circuitry to selectively provide solenoid energize signals to solenoids associated with opening and closing of predetermined chamber port valves associated with the manifold 34. Individual solenoid energize signals, sent from the solenoid driver circuitry via control lines 36, are received by solenoids associated with the manifold 34 and air mattress 12. The energize signals energize or deenergize the predetermined receiving solenoid (s) to open or close chamber ports (not specifically shown), associated with the air mattress 12 and manifold 34, and control inflation and deflation of selected air chambers of the air mattress 12.

The diaphragm air pump 16 is connected or coupled to the manifold 34 via at least one air-line (i.e., Line1, Line2 of FIG. 1). The manifold 34 directs air flow into (or out of) air chambers and/or bladders of the air mattress 12 to allow for inflation and/or deflation of the air mattress 12. The conventional controller 18 is connected, via the solenoid drivers in the driver circuitry 28, to various valves (e.g., solenoids and chamber port valves) to control inflation and deflation operations of the air mattress air chambers or bladders.

The microcontroller 30 is a central processor or an embedded processor of the air pump unit 14. The microcontroller is connected to the various circuits associated with conventional controller 18.

A remote interface circuit 38 provides a direct or indirect, wireless, or wired user interface that enables a user to control various inflation and deflation functions of the air bed system 10. Additionally, the remote interface may enable wired or wireless coupling of other user functions associated with the air bed system 10, but the remote interface cannot specifically control inflation or deflation rates of the air mattress' chambers and/or bladders. A drawback of prior conventional controllers is that they cannot provide fine-tuned air inflation flow rates by adjusting the speed, power, or air throughput in liters/minute (1/min) of the AC diaphragm air pump without the use of an AC motor controller, which does not solve the inefficiency problem of using an AC sinusoidal waveform or the problem of fluctuating AC line or wall socket voltages.

Pressure sensor circuitry 40 is connected or coupled to pressure sensing devices (not specifically shown) associated with the air mattress 12 and manifold 34. The pressure sensing devices can be used to sense the amount of air pressure (psi) in various ones of the air mattress' chambers or bladders. Sensing the air pressure or change in air pressure of various air mattress chambers or bladders provides a reason for the microcontroller to be configured to sense an increase in pressure at a location or with respect to weight changes from location to location on the air mattress that can be associated with the weight of or movements associated with, for example, a person sitting, laying, or otherwise on the air mattress 12.

In a prior art example of the air bed system 10, the diaphragm air pump 16 used is a Hailea pump air pump (Hailea "Motor-Driven Diaphragm AP-25") driven by a 12 VAC, 60 Hz, sine wave driving voltage provided by the conventional controller 18. A test was conducted using the conventional controller 18 of FIG. 1 in combination with the Hailea air pump 16 driven by a 12V AC, 60 Hz sine wave driving voltage provided from the transformer 22. Results of the test are provided here and in Table 1 provided below, the time required to inflate a chamber of a selected air mattress (i.e., a Rapid Air 2-Zone King bed chamber) from 0.30 psi to 0.84 psi was measured to be 90 seconds.

Figure 2:
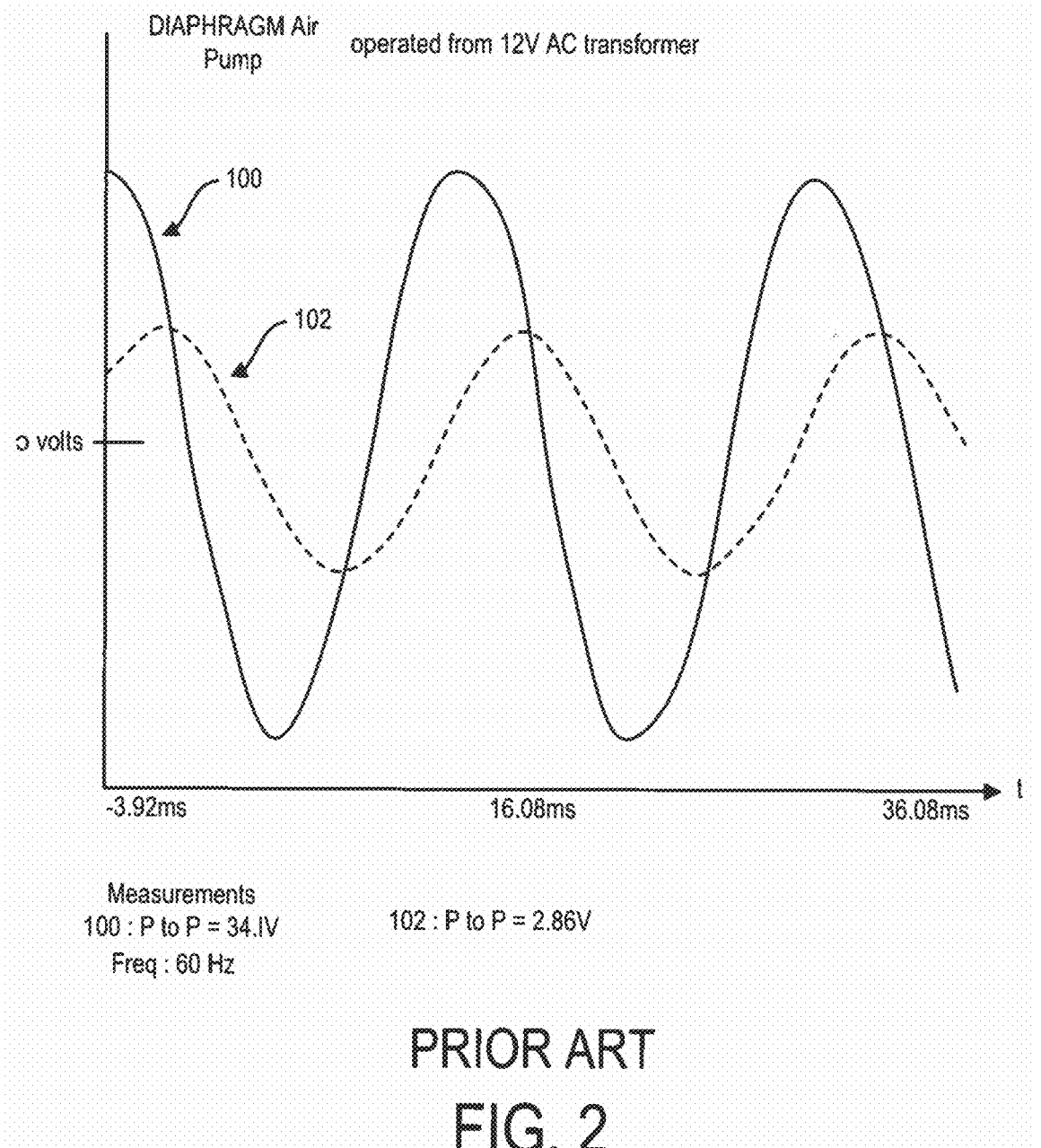
FIG. 2 is a plot illustrating voltage and current sine waveforms corresponding to diaphragm pump input AC voltage and current waveforms recorded during operation of an AC diaphragm air pump in the air bed system of FIG. 1.

FIG. 2 is a plot illustrating a voltage and a current waveform over time corresponding to diaphragm pump voltage and current waveforms, respectively, recorded during the test operation of the Hailea air pump as the diaphragm air pump 16. FIG. 2 depicts an input voltage waveform 100 as the 12 VAC 60 Hz sine wave measured between a $1^{st}$ AC voltage connection 42 and a $2^{nd}$ AC voltage connection 44 of the Hailea diaphragm air pump 16 and an input current waveform 102 measured and derived from the voltage 46 measured across a current sensing resistor 48, connected between the $2^{nd}$ AC voltage connection 44 of the diaphragm pump 16 and relay 32, normally open terminal, when the normally open terminal is closed during operation of the air pump unit 14 of FIG. 1. More specifically, the input current waveform 102 was created by measuring the voltage 46 across a 0.5 ohm current-sense resistor 48, which provides the respective input current waveform 102 passing through $2^{nd}$ AC voltage connection 44 of the diaphragm air pump in FIG. 1. During operation, the $1^{st}$ AC voltage connection 42 had a 34.1V peak-to-peak voltage (which is about equal to 12.0 VAC, RMS), and the $2^{nd}$ AC voltage connection 44 had a 2.86 peak-to-peak voltage across the current-sense resistor 48 (which corresponds to about a 2.0A AC, RMS sine wave as the diaphragm air pump current). It is noted that in this test, the diaphragm air pump 16 was operated at 12 VAC rather than 120 VAC to simplify the testing set-up. It is further noted that commercial embodiments utilizing the same Hailea diaphragm air pump can be operated using the 120 VAC instead of the 12 VAC transformed power. However, regardless of the diaphragm air pump input voltage (12V AC or 120 VAC), the input current waveform 102 shape will be substantially the same. Additionally, due to the inductance of winding 332 and use of the 120 VAC wall socket or line voltage, it is noted that the input voltage waveform 100 leads the input current waveform 102 a little.

Figure 3:
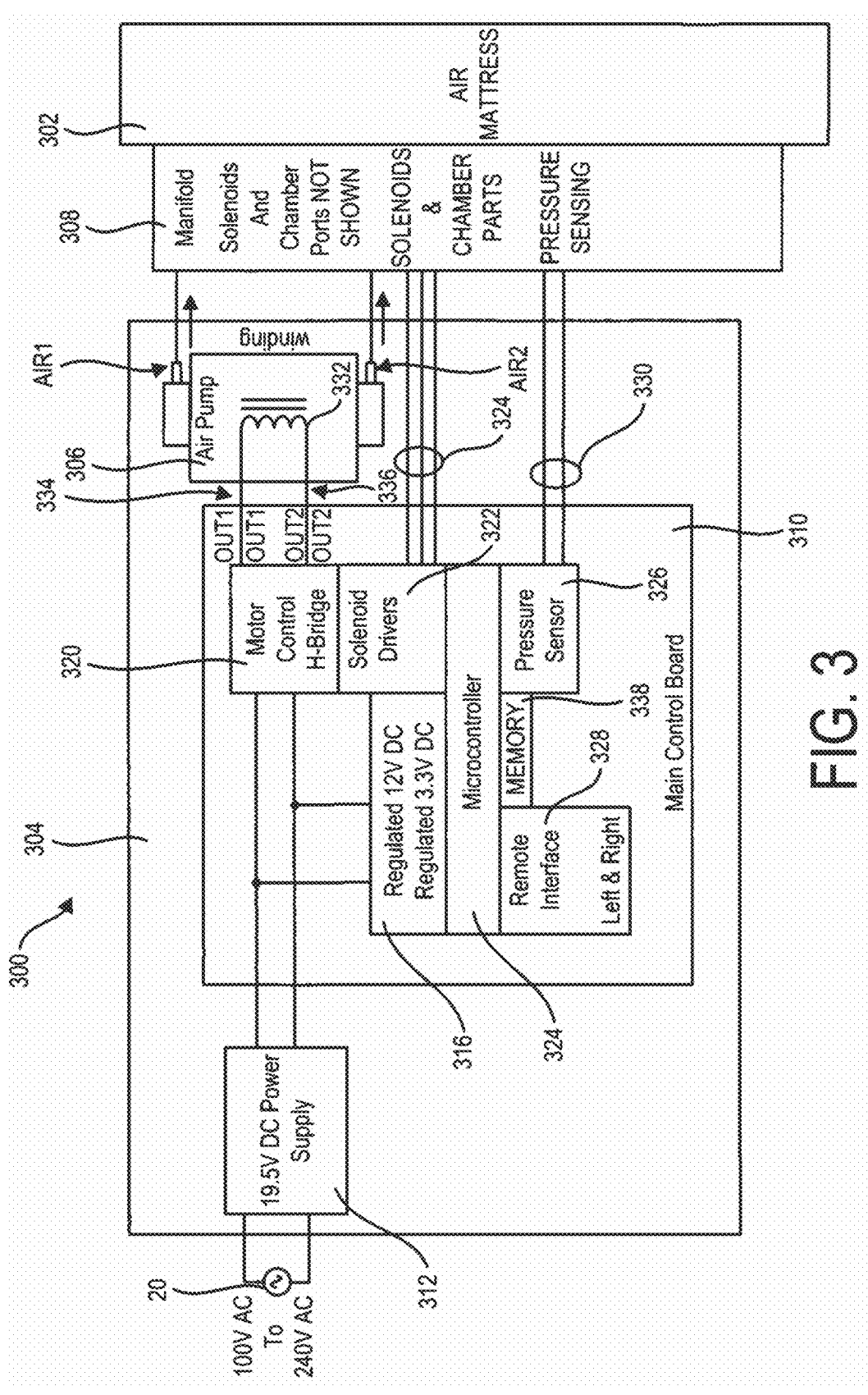
FIG. 3 is an example block diagram schematic illustrating components of an air bed system according to an embodiment of this disclosure.

FIG. 3 is an example block diagram schematic illustrating various components of a home-use or medical-use air bed system 300 according to an embodiment of the disclosure. The embodiment of the home-use or medical-use air bed system 300 shown in FIG. 3 is for illustration only. Other embodiments of home-use or medical-use air bed systems could be used without departing from the scope of the disclosure.

According to an embodiment of the present disclosure, the air bed system 300 includes an air mattress 302 having at least one chamber or bladder that can be filled with air (not specifically shown). The air bed system 300 further includes an air pump unit 304, which operates to perform various functions, including to control the pumping of air into the air mattress 302 via an AC diaphragm air pump 306, a manifold 308, and associated solenoids and chamber ports (not specifically shown). The AC diaphragm air pump 306 may be associated with or be part of the air pump unit 304 and/or the main controller 310.

The main controller 310 receives regulated DC power from a DC power supply 312. The DC power supply 312 may be separated from or incorporated into the air pump unit 304. The DC power supply is adapted to connect or couple to AC power 20. The AC power 20 may be sourced from a conventional wall outlet that provides between 110 and 240 VAC. In FIG. 3, the DC power supply 312 is an AC to DC power converter circuit that produces a regulated DC voltage output. The DC power supply 312 is coupled to the main controller 310 and provides a regulated DC output of 19.5 VDC. Incorporating the DC power supply 312 into this example embodiment eliminates the prior art need for the conventional controller 18 to include the transformer circuit 22 to step the 110 to 240 VAC line input AC voltage down for a bridge rectifier circuit. Further, this embodiment eliminates the need for the bridge rectifier circuit 24 of FIG. 1, which rectifies the output from the transformer 22 into an unregulated DC voltage that must be further regulated into useful regulated voltages for various circuits in the conventional controller 18. Additionally, the regulated DC power supply 312 provides better voltage and current isolation from the AC power 20 because in the embodiment shown AC power is not brought directly to the main controller board 310. In other embodiments AC power may be brought directly to the controller board 310 if the controller board 310 includes or incorporates a regulated AC to DC power supply that performs a similar function as the regulated DC power supply 312.

The DC power supply 312 is connected or coupled to both voltage regulator circuitry 316 and a DC motor driver circuit 320. The DC power supply 312 provides regulated DC power to various associated circuits and components of the air bed system 300. In this embodiment, the DC power provided is 19.5 VDC, but it is understood that any reasonable DC voltage needed to operate an AC diaphragm air pump in accordance with this disclosure and also provide DC power to other circuits associated with the air pump unit 304 is acceptable. Additionally, the DC power supply 312, in other embodiments, may output multiple regulated DC voltages and eliminate a need for the voltage regulator circuitry 316.

In this example embodiment, the voltage regulator circuitry 316 converts the received 19.5 VDC to regulated 12 VDC and regulated 3.3 VDC outputs for use by other circuitry and logic circuits in or associated with the air pump unit 304. Solenoid driver circuits 322 utilize the provided 12 VDC and 3.3 VDC to power logic circuits and provide solenoid signals via solenoid control lines 325. Solenoid signals provided on the solenoid control lines 325 are used to energize and deenergize solenoids (not specifically shown) associated with the manifold 308 and air mattress 302. The individual solenoids are used to control the opening and closing of a plurality of chamber ports (not specifically shown), which are used to control and direct air movement through the manifold 308 to inflate or deflate one or more air chambers or bladders (not specifically shown) in the air mattress 302.

The microcontroller 324 is the main processor of the air pump unit 304. The microcontroller 324 is connected or coupled to the various circuits on or associated with the main controller 310. For example, the microcontroller 324 may be configured to receive signals from and/or send signals to various circuits of the main controller board 310 including the solenoid drivers 322, the DC motor driver circuit 320, the pressure sensor circuitry 326, and the remote interface circuitry 328. In some embodiments, the microcontroller 324 sends control signals to the voltage regulator circuitry 316. Additionally, the microcontroller 324 may receive status, feedback, or other signals from any of the circuitry or devices associated with the main controller 310.

A remote interface circuitry 328 provides a direct or indirect, wireless, or wired user interface enabling a user to control the various functions, including inflation and deflation functions of the air bed system 300. Additionally, the remote interface circuitry 328 can enable wired or wireless coupling of other user functions associated with the air bed system 300, but not specifically related to the control of inflation or deflation of the air mattress 302's air chambers and or bladders. For example, the remote interface circuitry 328 may enable control of mattress temperature, vibrations, tilt, and other functions not specifically discussed in this air bed system 300 disclosure. The remote interface circuitry 328 is coupled and configured to provide control and other signals to the microcontroller 324 so that the microcontroller can, in turn, control and provide appropriate signals to control the AC diaphragm air pump 306 via the DC motor driver circuit 320.

Pressure sensor circuitry 326 is coupled and in communication with the microcontroller 324. The pressure sensor circuitry 326 is connected or coupled to pressure sensing devices (not specifically shown) associated with one or more portions of the air mattress 302 and manifold 308. The sense lines 330 connect the pressure sensing devices to the pressure sensor circuitry 326. In various embodiments the sense lines 330 may be pneumatic or electrical. If the sense lines are pneumatic, the pressure sensor circuitry 326 will include air pressure to voltage sensors.

Still referring to FIG. 3, the microcontroller 324, in some embodiments of this disclosure, may be an embedded processor, which like a microcontroller, can operate as a dedicated processor having less computational power than a microcontroller. The microcontroller 324 may include circuitry or be a single integrated circuit chip comprising a processor, integrated memory, and I/O circuits configured to control or interact with various circuits and devices on and associated with the main controller 310. Such various circuits and devices include the voltage regulator circuitry 316, the solenoid drivers 322, the pressure sensor circuitry 326, the remote interface circuitry 328, and the DC motor driver circuit 320. In various embodiments of the disclosure, the microcontroller 324 could be an embedded processor that includes or is connected to memory 338. Thus, in embodiments of this disclosure, the microcontroller 324 can be a processor, microcontroller, embedded processor, or microprocessor.

The microcontroller 324 of embodiments of the present disclosure may be relatively simple in design, have limited computational power and input/output (I/O) capabilities. Microcontroller 324 may have minimal power requirements as compared to more advanced microprocessors found in higher functioning computer systems. In an embodiment of the present disclosure, the microcontroller 324 is a Freescale Kenetis KL04 32 KB Flash, 48 MHz Cortex-M0+ based microcontroller that operates efficiently with ARM Cortex-M0+ 32-bit performance. One of ordinary skill in the art will understand that there are various processors and microcontrollers that can be used in embodiments of the disclosure.

In various embodiments of the disclosure, the DC motor driver circuit 320 includes an H-Bridge DC motor driver circuit. In the embodiment of FIG. 3, the DC motor driver circuit 320 can be a Texas Instruments DRV8840 H-bridge motor driver integrated circuit. The DRV8840 H-bridge motor driver includes a H-bridge driver and, according to the Texas Instruments DRV840 DC Motor Driver specification sheet, is intended to drive one DC motor. In general, a H-bridge is an electronic circuit that switches the polarity of a voltage applied to a load. H-bridge circuits are often used in robotics and other applications to allow DC motors to run forwards or backwards. The name, H-bridge, is derived from the circuit's common schematic diagram representation, with four switching elements, usually transistors, configured as branches of the letter "H" and the load is connected to the crossbar of the "H."

In examples of the disclosure, the DRV840 DC motor driver circuit 320 is used to provide two separate DC square waveform outputs, OUT1 and OUT2, to drive an AC diaphragm air pump 306. The two separate DC square waveform outputs, OUT1 and OUT1, each are at the same frequency, but are 180 degrees out of phase. Each one of the two 180 degree out of phase square waveforms, OUT1 and OUT2, is connected to a separate input of the AC diaphragm air pump 306. The two separate inputs of the AC diaphragm pump coincide respectively with connections on opposite sides of the coil or winding 332 of the diaphragm motor's electromagnet. An unexpected result of using the DC motor driver circuit 320 with an H-bridge output in the example embodiments is that the air flow output of the AC diaphragm air pump 306 is significantly improved when compared to a same diaphragm air pump 16 installed in the conventional air bed system 10 of FIG. 1. Improvements of embodiments of the disclosure include quieter diaphragm air pump operation and increased air throughput of the AC diaphragm air pump 306. The improvements are particularly noticeable when the same diaphragm air pump is used as the diaphragm air pumps 16 and 306 of FIGS. 1 and 3.

The DC motor driver circuit 320 used in the present disclosure may also include additional features including internal circuit shutdown functions provided for internal overcurrent protection, short circuit protection, overvoltage lockout, and overtemperature conditions.

Various embodiments of the disclosure can include DC motor driver circuit 320 that is configurable to provide decay mode circuitry or functionality (not specifically shown in the figures). Decay mode circuitry or functionality can provide a ramp stop braking function or a coast to stop function to the AC diaphragm air pump motor. A ramp stop braking function is a technique utilized in some embodiments of the present disclosure by setting the enable and the decay inputs of the DC motor driver circuit 320 low.

The ramp stop braking function effects the two DC square wave outputs by pulling both OUT1 and OUT2 waveforms to a low or to a 0 VDC setting. While OUT1 and OUT2 are held low the current in the coil will go to zero. As a result, the pseudo square current waveform 600 will go to zero for a predetermined amount of time equal to the DC motor driver circuit being in the ramp stop braking function. While in ramp stop braking function the oscillating movement of the diaphragm motor will rapidly ramp down or slow down to and be held by a magnetic force at a standstill.

Alternatively, a coast to stop function is an alternative technique that allows the oscillating parts of the diaphragm pump to coast to a standstill at their own pace. The coast to stop function can is initiated by setting the enable input to low and the decay input to high, which will set the outputs of the H-bridge circuit to have a high impedance, which will effectively allow any oscillation movements to slow or coast to a stop because there will not be any magnetic force created in the diaphragm pump's winding 332.

Both techniques are a form of frictionless braking wherein, for example, no brake pad or obstacle is moved to contact the diaphragm motor's rod or any moving motor parts to slow or stop the oscillation movements. A reason for using the ramp stop function or coast to stop function, in some embodiments, is to provide immediate or coast to stop control over stopping the diaphragm pump motor or other type of air pump motor. For example, a smooth air pump and air flow slow down over a period of time, rather than an abrupt stopping of the pump and the related air flow (or vis-à-vis) into the air mattress 302, can be configured or part of the configuration using the decay mode circuitry or functionality to perform a controlled electronic ramp stop or coast to stop slowing of the diaphragm or other type of air pump motor to a stop.

Ramp stop and coast to stop types of AC motor control often consume considerable electrical power when using prior AC motor control circuitry. Additionally in some embodiments, ramp stop and coast to stop motor control, provide a smoother or more controlled slowdown of airflow that is advantageous because a user on an associated air mattress may experience a decreased sense of the air flow stoppage into an air bladder of the air mattress and leveling off of the air bladder hardening as an embodiment controlled mattress inflation process ends with, for example a microcontroller controlled slowing of the air pump motor that concludes with a coast to stop function.

Additionally, in some embodiments, a ramp stop function can be configured for use when an over pressure event is sensed by the microcontroller 324 via the pressure sensing circuitry 324. Upon sensing an over pressure or over inflation of a mattress air bladder, a ramp stop function signal can be communicated by the microcontroller to the DC motor driver circuit 320 to thereby immediately stop the pumping of air by the AC diaphragm air pump 306 or other type of air pump. It is understood by those having knowledgeable in the art that the microcontroller 324 may be configured to provide appropriate ramp to stop or coast to stop signals to the DC motor driver circuit 320.

An air bed system 300 that can control inflation and deflation air chambers and/or air bladders in the air mattress 302 is intended to be a comfortable place for a user or medical patient to rest or sleep. One factor found important to air bed system users, is that when laying on the air mattress 302, the user should have minimal awareness of changes of air bed system sounds and air bed mattress movements. Thus, slowing the inflation of a hardening air mattress bladder or chamber (And, in some embodiments, using the coast to stop function) as it reaches a desired inflation pressure is a desired function even though the user may still hear a bit of a motor voltage hum of the diaphragm motor's sound but not experience or feel much air bladder change of movement sensation as the air chamber or bladder's inflation slows to a stop.

It must be pointed out that the pumping action, oscillations, sounds and airflow of the AC diaphragm air pump 306 can also be sped up or slowed down using other techniques. In various embodiments speeding up or slowing down of the AC diaphragm air pump 306 may be accomplished by any one or more of (a) decreasing/increasing the OUT1 and OUT2 square waveform frequency, (b) decreasing/increasing the max V voltage of the OUT1 and OUT2 square waveforms, and (c) by decreasing/increasing the +/−max current that can go through the winding 332. All this AC diaphragm pump motor control functionality, which was not previously available, is now available by configuring the microcontroller 324 to communicate with and adjust settings on the DC motor driver circuit 320.

Figure 4A:
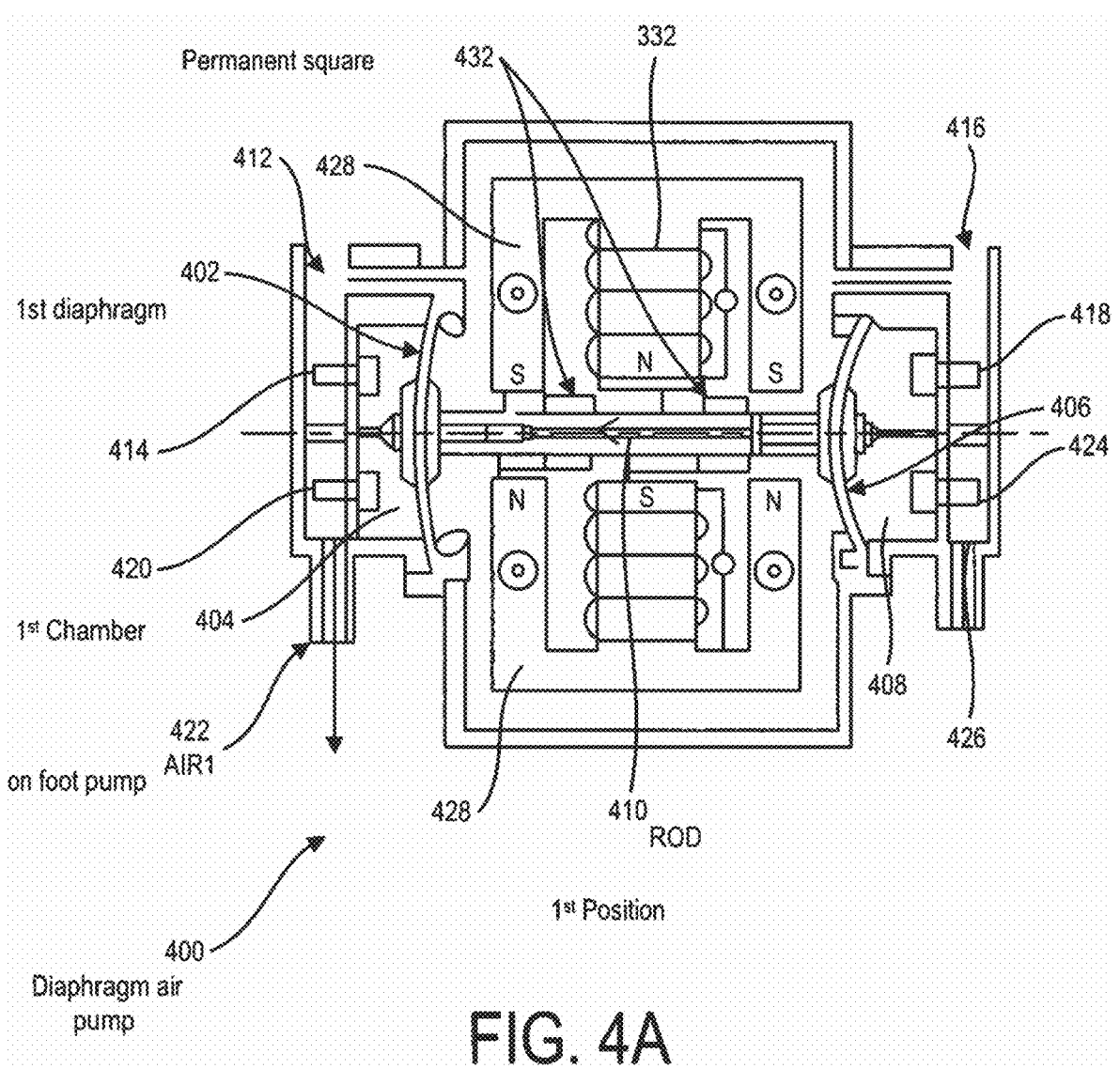
FIGS. 4A and 4B are drawings of an example diaphragm air pump used in an embodiment of the invention.
Figure 4B:
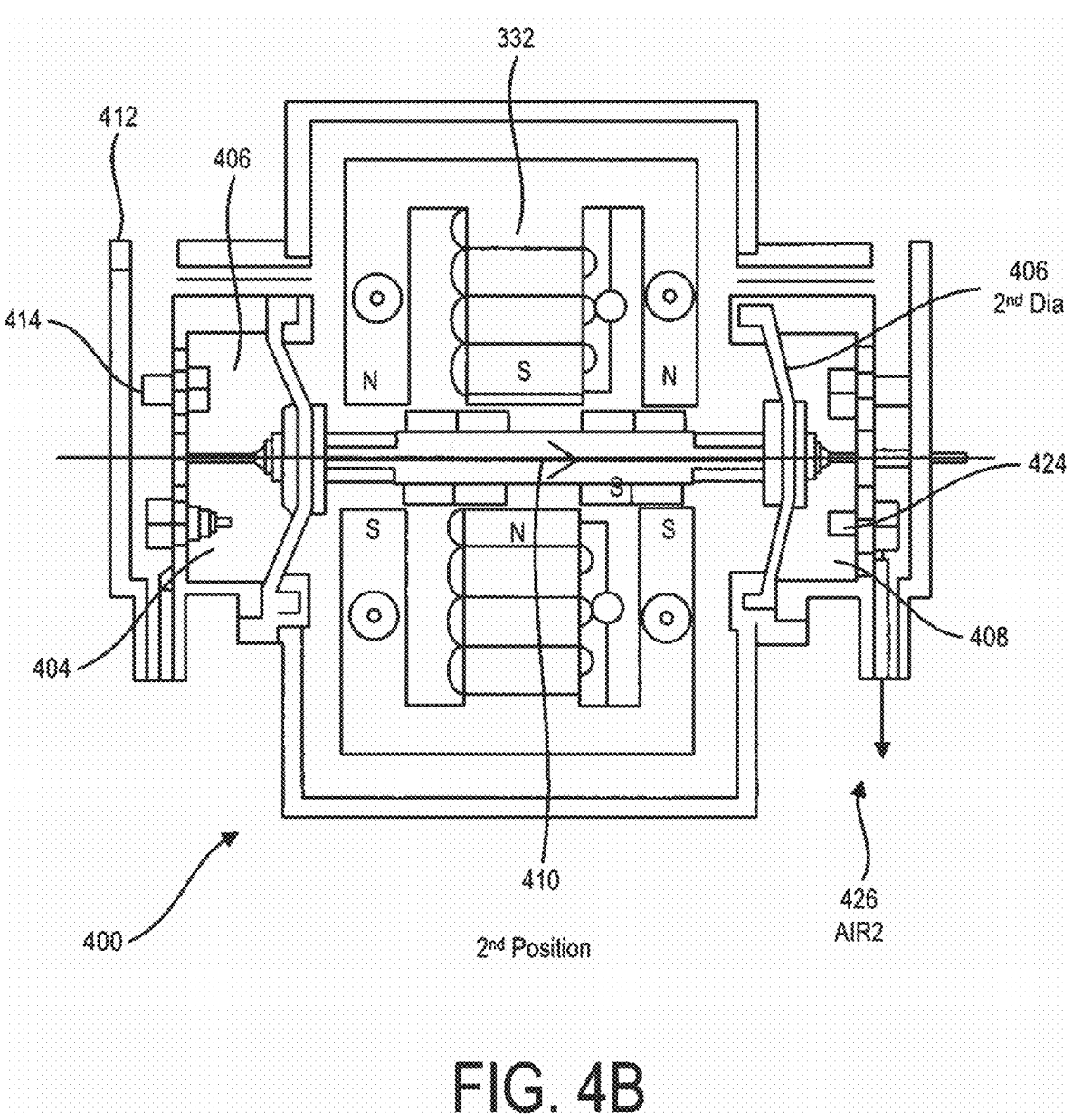

FIGS. 4A and 4B provide a cutaway drawing illustrating an example AC diaphragm air pump 400 according to various embodiments of the present disclosure. The embodiment of the AC diaphragm air pump 400 shown in FIGS. 4A and 4B is for illustration only. The example AC diaphragm air pump 400 resembles a Hailea model ACO-9810/9820 diaphragm air pump. Other single or double diaphragm air pumps could be used in various embodiments without departing for the scope of the disclosure. The diaphragm air pump 400 shown is a double diaphragm or membrane air pump.

The diaphragm air pump 400 shown has a double chamber and is a double diaphragm air pump. A $1^{st}$ diaphragm 402 is associated with a $1^{st}$ chamber 404 and a $2^{nd}$ diaphragm 406 is associated with a $2^{nd}$ chamber 408 of the diaphragm air pump 400. The $1^{st}$ and $2^{nd}$ diaphragms 402, 406 are attached to opposing ends of a diaphragm pump motor rod 410. FIGS. 4A and 4B depict the same diaphragm air pump 400 with the diaphragm pump motor rod 410 in a $1^{st}$ and $2^{nd}$ position, respectively. During operation of the AC diaphragm air pump 400, the rod 410 oscillates back and forth between the $1^{st}$ and $2^{nd}$ positions as indicated by the arrow on rod 410 in FIGS. 4A and 4B.

The $1^{st}$ chamber 404 includes a $1^{st}$ intake port 412 and a $1^{st}$ intake valve 414, which opens to allow air to flow into the $1^{st}$ chamber as the rod 410 moves from the $1^{st}$ to the $2^{nd}$ positions shown in FIGS. 4A and 4B. Similarly, the $2^{nd}$ chamber includes a $2^{nd}$ intake port 416 and $2^{nd}$ intake valve 418, which opens to allow air to flow into the $2^{nd}$ chamber. Additionally, the $1^{st}$ chamber 404 includes a $1^{st}$ output valve 420 and $1^{st}$ output port 422 (AIR1) to open and allow air to flow out of the $1^{st}$ chamber 404 and into the manifold 308. Likewise, the $2^{nd}$ chamber 408 includes a $2^{nd}$ output valve 424 and $2^{nd}$ output port 426 (AIR2) to open and allow air to flow out of the $2^{nd}$ chamber 408 and into the manifold 308.

The diaphragm air pump 400 includes electromagnet 428, which, when current flows through the electromagnet 428, is energized by the output DC square waves, OUT1 and OUT2 to create an alternating magnetic field. The OUT1 and OUT2 waveforms are provided from the H-bridge circuitry of the DC motor control driver circuit 320 as the $1^{st}$ input 334 and $2^{nd}$ input 336 to the diaphragm air pump 400. The two DC square waves, OUT1 and OUT2, are 180 degrees out of phase and are effectively controlled by the H-bridge switched circuitry of the DC motor control driver circuit 320 to have a frequency and a switching current direction to operate as a pseudo AC square wave (see, FIG. 6) across the winding 332 of the AC diaphragm air pump 400. Thus, the two 180° pseudo-AC square waves, OUT1 and OUT2, are input into the $1^{st}$ input 334 and the $2^{nd}$ input 336 of the diaphragm air pump 400 and energize the electromagnet 428 via winding 332 to create an alternating magnetic force.

The created alternating magnetic force acts on the magnetic poles of permanent magnets 432, which are fixed to the rod 410 and proximate to the electromagnetic winding 332, causing magnetic actions of attraction and repulsion to move and oscillate the rod 410 in back-and-forth directions between positions shown in FIGS. 4A and 4B. The rod 410 vibrates at the pseudo-AC square waveform 600 frequency, which is the same frequency as the output DC square waves, OUT1 and OUT2. FIG. 4A depicts a $1^{st}$ oscillation direction (see, the arrow on rod 410) of rod 410. During movement in the first direction, $1^{st}$ diaphragm 402 is moved to decrease the $1^{st}$ chamber 404 size while air is exhausted from the $1^{st}$ chamber 404 via the $1^{st}$ output valve 420 and output port 422 (AIR1).

Meanwhile, air is taken into the $2^{nd}$ chamber 408 via $2^{nd}$ intake port 416 and $2^{nd}$ input valve 418. FIG. 4B depicts a $2^{nd}$ oscillation direction (arrow on rod 410) of rod 410. During movement of the rod 410 in the second direction, the $1^{st}$ diaphragm 402 is moved to increase the first chamber size while air is pulled into the $1^{st}$ chamber 404 via the $1^{st}$ intake port 412 and $1^{st}$ intake valve 414. Meanwhile, air is exhausted from the $2^{nd}$ chamber 408 via the $2^{nd}$ output valve 424 and $2^{nd}$ output port 426 (AIR2). The rod 410 oscillates or vibrates at the DC square waves' frequency causing air to be drawn into and then exhausted from the respective $1^{st}$ and $2^{nd}$ chamber's spaces caused by respective $1^{st}$ and $2^{nd}$ diaphragm 402, 406 movements and the repeated cycles of air intake and exhaust attained by the operation of the respective chamber intake and output valves.

Figure 5A:
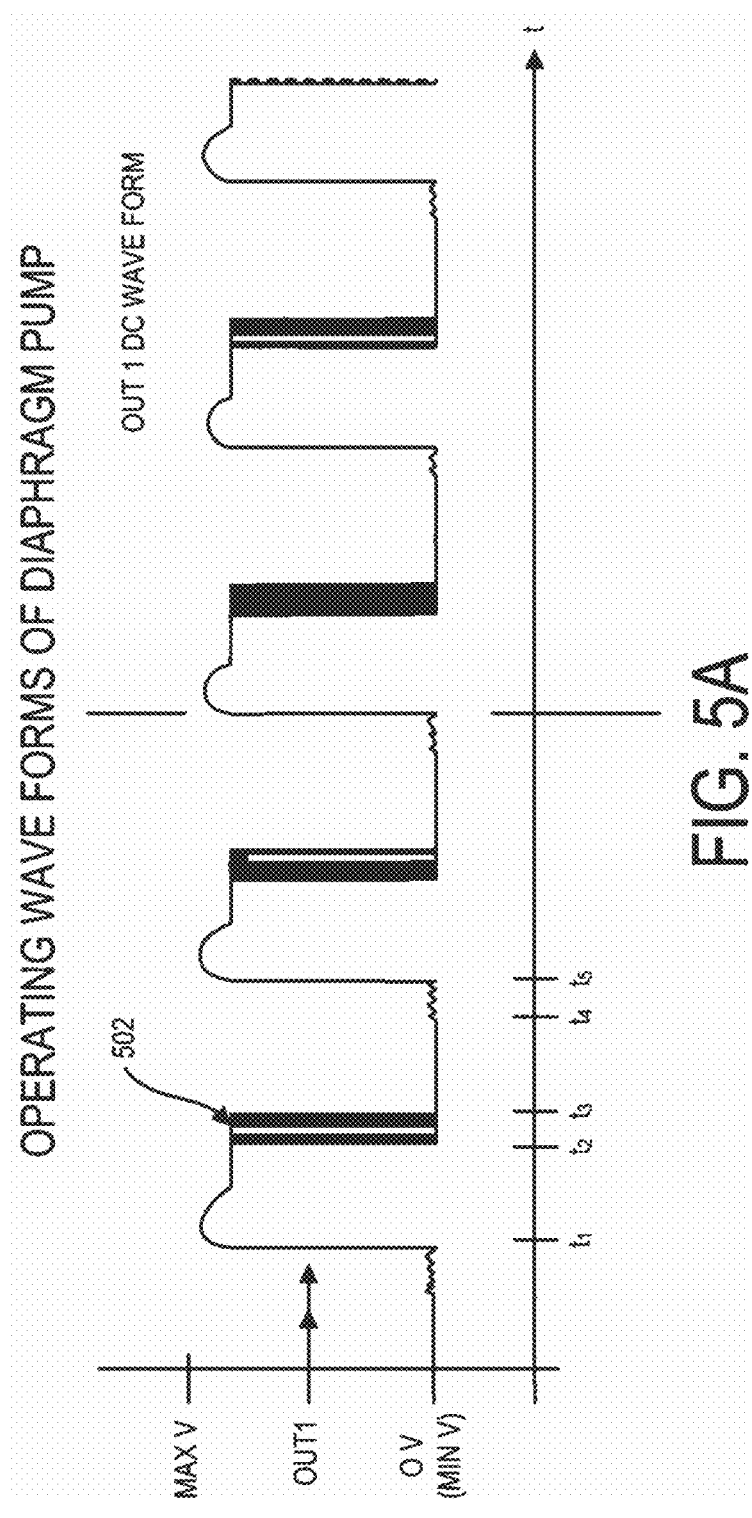
FIGS. 5A and 5B are plots illustrating measured DC voltage square waveforms provided to a diaphragm air pump during operation of an embodiment of the invention.
Figure 5B:
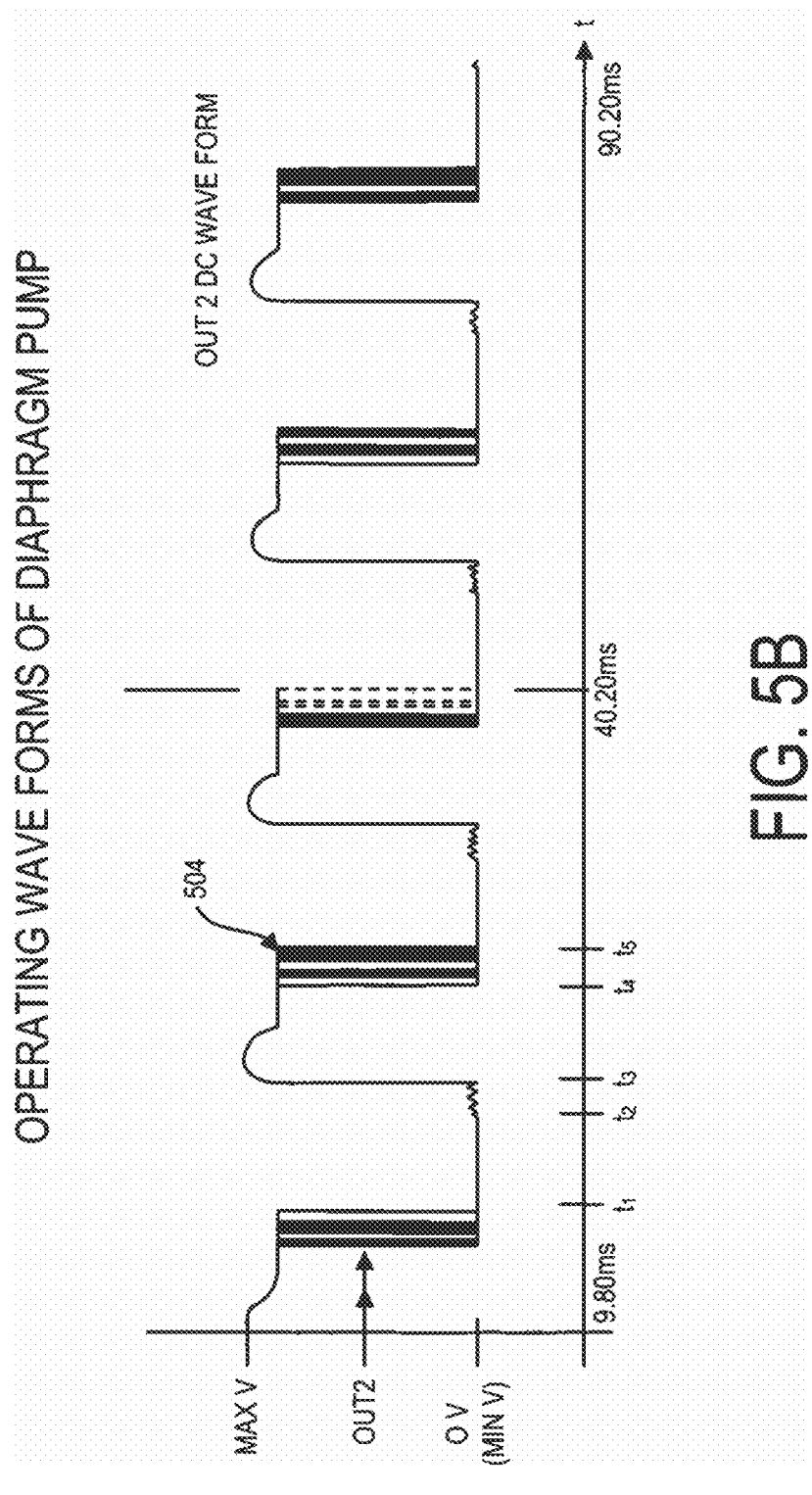

FIGS. 5A and 5B are plots illustrating measured DC voltage waveforms provided to a diaphragm air pump during operation of an embodiment of the invention. The DC square waveforms, OUT1 and OUT 2, are output from the H-bridge circuitry of the DC motor driver circuit 320 and input into $1^{st}$ input 334 and $2^{nd}$ input 336 into the AC inputs of the diaphragm air pump 400. OUT1 and OUT2 are two 180 degrees out of phase DC square wave forms each having the same frequency and similar peak-to-peak ("p-p") voltages. Since OUT1 and OUT2 were measured during operation of the AC diaphragm air pump 400, the square waveforms become pseudo square waveforms probably due to impedance (e.g., inductance of winding 332) effects on the square waveforms.

During operation of the diaphragm air pump's winding 332, a "pseudo AC square wave" results from the output combination of OUT1 and OUT2 driving opposing sides of the diaphragm air pump and because the DC motor driver's H-bridge circuit switches the 180 degree out of phase DC square waves, back and forth through different channels of the H-bridge MOSFET transistors thereby effectively creating alternating current pseudo AC square wave current 600 through the electromagnet's coil winding 332. The pseudo AC square wave switches the voltage polarity, the current flow, and the magnetic force of the electromagnet winding 332, and as described above with respect to FIGS. 4A and 4B, moves the rod 410, $1^{st}$ diaphragm 402 and $2^{nd}$ diaphragm 406 back and forth to oscillate at the frequency of the pseudo AC square waveform 600.

Although H-bridge DC motor controller/drivers that provide DC square wave output(s) to drive DC motors are a relatively standard item, incorporating different types of DC motor controller/drivers into embodiments of the invention may affect the number of AC diaphragm motor controls available in a resulting embodiment of the invention. For example, although the example embodiment in FIG. 3 is described as incorporating a DRV8840 DC motor driver IC, one of ordinary skill in the art can utilize other off the shelf DC motor controllers and modify the associated circuitry to achieve other embodiments of this disclosure. Some existing possible DC motor controller circuits that could be used include, but are not limited to, a Texas Instruments DRV8871, DRV8814, or DRV8829; a NXP MC33931, or MC33926 series H-bridge driver.

Still referring to FIGS. 3, 4A, 4B, 5A, 5B, and 6, an example embodiment of the air bed system 300 has a main controller 310 that includes the microcontroller 324. The microcontroller 324 is coupled to and configured to provide control signals to the DC motor driver circuit 320. In response to receipt of control signals from the microcontroller 324, the DC motor driver circuit 320 provides a $1^{st}$ DC waveform, OUT1, as a $1^{st}$ input 334 of the AC diaphragm air pump 306. The DC motor driver circuit 320 also provides a $2^{nd}$ DC waveform, OUT2 DC wave form as a second input 336 of the AC diaphragm air pump 306.

The H-bridge circuitry of the DC motor driver circuit 320 effectively creates two 180 degree out of phase DC square waveforms OUT1 and OUT2 that are respectively provided to the $1^{st}$ and $2^{nd}$ inputs 334, 336 of the AC diaphragm air pump 306. The two 180 degree out of phase DC square waveforms are created and switched by the H-bridge circuitry such that at time t1, while the OUT1 square wave changes one side of the winding 332 from 0 V to maxV volts, the OUT2 square wave is simultaneously changing the other side of the winding 332 from the maxV to 0 V volts.

The rapid voltage change across the winding 332 caused by the switching of the H-bridge causes the current in the coil to change directions through the winding 332. The current increases in the changed direction through the winding 332 at a rate dependent on the rate of change of the voltage across the coil and the impedance (inductance and series resistance) of the coil or winding 332. Since the rate of the voltage change is substantially instantaneous, from 0 V to maxV volts, the current increases very quickly through the coil at a near exponential rate. It is can be understood that since the two 180 degree out of phase square waves respectively connected to opposite sides of the winding 332 change the voltage across the winding instantaneously, as compared to a slower change in voltage across the winding 332 caused by an AC sine wave originated from a 60 Hz 120 VAC line power that the pseudo square AC waveform can create a much higher rate of change than a sinusoidal AC waveform. The current flow can become so large that the coil or winding 332 of the AC diaphragm air pump 306 can be over driven, burn out, damaged.

To protect against damaging the AC diaphragm air pump 306 and/or the motor control H-Bridge, in embodiments of this disclosure, a peak current or +/−Max current through the motor winding 332 can be set and regulated by the DC motor controller 320. The peak current can be set in several ways. For example, the microcontroller 324 can provide a peak current signal or setting to the DC motor driver circuit 320. In other embodiments, one of a pulse width modulated (PWM) signal, a current regulation signal, or current chopping signal (each referred to herein interchangeably as a "current regulating signal" or "current regulating input") may be communicated or coupled to one or more inputs of the DC motor driver circuit 320 directly or indirectly from an output port of the coupled microcontroller 324. Alternatively, in other embodiments, the iMax current regulating signal can be set by using a voltage level or current sensing resistor connected to a current sensing input of the DC motor driver circuit 320. Any one or combination of current sensing and current limiting techniques a be used with various DC motor driver circuits.

Figure 8:
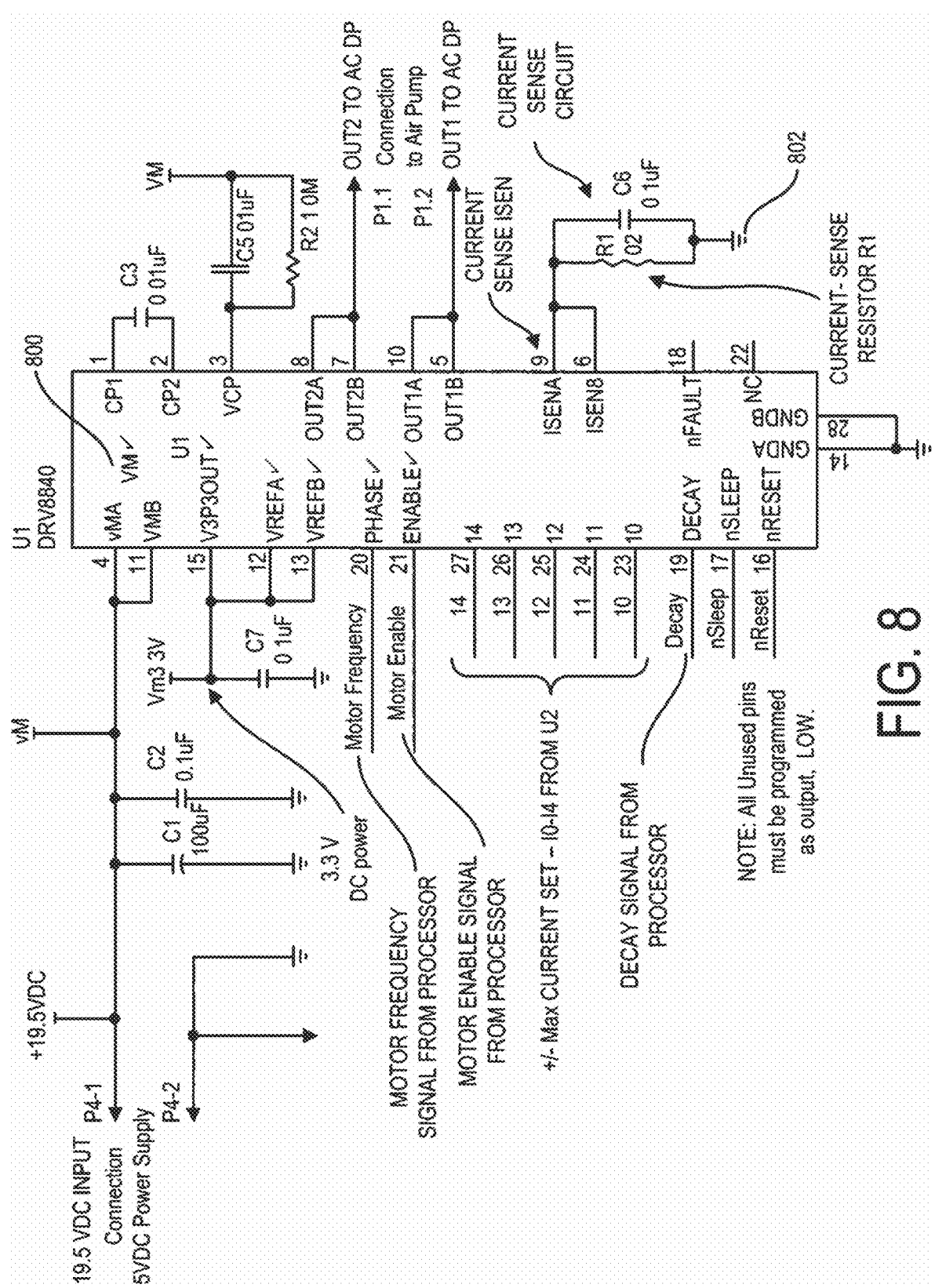
FIG. 8 is a circuit diagram schematic that includes a DC motor driver circuit of an embodiment of the invention.

Referring to FIG. 8, in addition to being able to set current regulation by providing a current regulation signal from another device, in example embodiments, a current sensing circuit may be part of or external to the DC motor driver circuit 320. For example, in FIG. 8, a Texas Instrument DRV8840 DC motor driver 800 is configured to provide two 180 degrees out of phase square wave outputs (OUT1 A&B and OUT2 A&B). Current sense input (ISEN A&B) is shown connected to a current sense circuit 801 that allows current, proportional to the current flow of OUT 1 and/or OUT2, to flow to ground through resistor R1 804 thereby creating a voltage drop across resistor R1 804 that will be read as current signal at the ISEN pins. When the current sense signal is sensed at the ISEN pins of the DC motor driver circuit 320 and the sensed current is at or above a predetermined or preset current (set at a relevant voltage), the DC motor driver circuit modulates or chops the OUT1 and OUT2 DC square waveforms being supplied to the AC diaphragm air pump 306 to prevent the diaphragm air pump's winding 332 from being overdriven.

Figure 6:
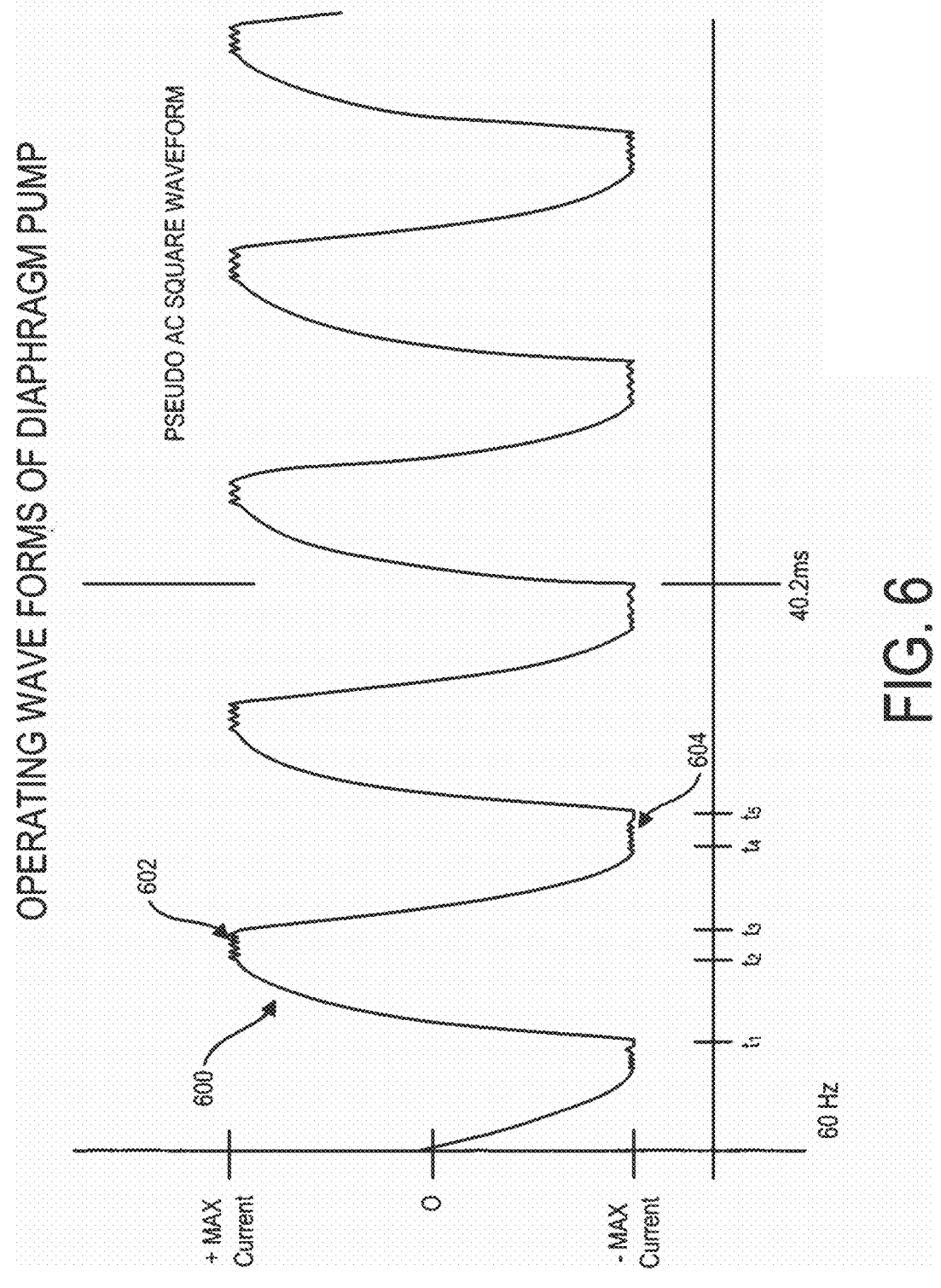
FIG. 6 is a plot illustrating a pseudo square wave waveform measured during operation of an embodiment of the invention.

FIGS. 5A and 5B show plots of measured DC voltage waveforms, OUT1 and OUT2, provided to the diaphragm air pump during operation. The OUT1 and OUT2 DC waveforms are shown with respective modulated or chopped signal portions 502 and 504 depicted. FIG. 6 is a plot illustrating a pseudo-AC square waveform 600 which shows the current going through the winding 332 part of the AC diaphragm air pump 306 during operation. The clipped tips or current peaks 602 and 604 of the current limited pseudo-AC square waveform 600 coincide with modulated or chopped signal portions 502 and 504 of the OUT1 and OUT2 waveforms, respectively. In some embodiments, the modulation or chopping of the OUT1 and OUT2 DC waveforms are performed at a set or predetermined pulse width modulation (PWM) frequency that is provided to or created within the DC motor driver circuit 320.

As found via experimentation, advantages of embodiments of this disclosure are related to the faster rise and fall times of embodiments that substantially create the pseudo AC square waveform 600 measured at the $1^{st}$ or $2^{nd}$ inputs 334, 336 of the AC diaphragm air pump 306 as compared to line AC power 20 sinusoidal AC current waveforms powering diaphragm air pumps. Other advantages of embodiments of this disclosure are related to the modulated or chopped tips or current peaks-and-troughs 602, 604 between rising and falling edges of the pseudo AC square waveform 600, all of which are created as a result of connecting the DC motor driver circuit 320 OUT1 and OUT2, DC square waveforms, as $1^{st}$ and $2^{nd}$ inputs 334, 336 to the AC diaphragm air pump 306 in various embodiments of this disclosure.

For example, the modulated or chopped tips or current peaks-and-troughs 602, 604 between rising and falling edges of the pseudo AC square wave 600 created using the OUT1 and OUT2 180 degree out of phase square waves create maximize the current rise (t1 to t2) and fall (t3 to t4) rates of the current waveform while limiting the current to a predetermined or preset maximum (+MAX) and minimum (−MIN) currents through the diaphragm motor and H-bridge circuitry. Additionally, the modulated or chopped rising and falling edges can occur anywhere in the waveform if there is a fault condition, which can further help protect the diaphragm motor and H-bridge circuitry from an over current condition.

The faster the fall and rise times of the pseudo-AC square waveform 600 current through winding 332, the greater the magnitude of the alternating and/or oscillating magnetic force created by the electromagnet 428 in the AC diaphragm air pump 400 during the rise and fall of the AC square waveform 600. The increased magnetic force results in the diaphragm, connected to the rod 410, being forced to move in each of its alternating directions more quickly, with a greater force, increased acceleration, and velocity. Since pump diaphragms are made of a flexible, stretchy, or pliable polymers, plastics, ethylene propylene diene monomers (EPDM rubber), thermoplastic polymers (TPE), thermoplastic elastomers (TPE), santoprene, neoprene, or other suitable material, the diaphragm pump stroke can be stretched to be longer than if a sinusoidal or other waveform with a slower rise and fall time was used.

Testing of embodiments of the invention have shown that the air, gas or fluid movement and volume in L/min through the same diaphragm air pump 400 is increased when using the two 180 degree out of phase DC square waveforms, such as OUT1 and OUT2, over air, gas or fluid movement in L/min using a sine wave AC voltage of substantially the same amplitude and frequency when used to inflate an air mattress in an air mattress system.

Additionally, the modulated or chopped tips or current peaks-and-troughs 602, 604 between rising and falling edges of the pseudo AC square waveform 600 that are substantially created as a result of connecting the DC motor driver circuit 320 OUT1 and OUT2 DC waveforms as the 1$^{st}$ and 2$^{nd}$ inputs 334, 336 of the AC diaphragm air pump 306 can be frequency adjusted to make diaphragm air pumps in embodiments of the disclosure from about −1 dB to −15 dB quieter than a same AC diaphragm air pump 306 operating on standard AC line power at about 50 Hz to about 60 Hz with a input voltage waveform 100 being substantially sinusoidal shown in FIG. 2. It was found that in embodiments of the disclosure, adjustment of the OUT1 and OUT2 frequency from between about 45 Hz to 70 Hz can change the output noise (dB) of the AC diaphragm air pump 306 to be louder than as well as from −2 dB to −15 dB quieter than a same diaphragm air pump powered by standard AC line power of about 120 to 240 VAC at about 60 and 50 Hz, respectively.

Additional embodiments of this disclosure may have sound level sensors located near the AC diaphragm air pump 306 to provide a sound level dB signal to the microcontroller. The microcontroller can at a request from the user interface or periodically vary the OUT1 and OUT2 180 degree out of phase DC square waveform's frequency between a predetermined frequency range to and use the sound level dB signal as feedback to tune the sound level of the diaphragm air pump to a minimum sound level dB produced by the diaphragm air pump by setting the OUT1 and OUT2 output frequencies at the frequency that produced the lowest sound level dB feedback. Thus, the diaphragm motor frequency is tuned to a frequency that produces a minimum noise or sound level dB while operating within a predetermined or desired oscillation frequency.

Further advantages of embodiments of the disclosure include that the electrical or power efficiency of embodiments of the disclosure are improved over prior art diaphragm air pump controllers or conventional air mattress control systems that use an AC power source with a sine waveform to power a diaphragm pump. Furthermore, since standard AC line power taken from a wall outlet often fluctuates in amplitude and frequency by 10% to −15%, the airflow output provided by a diaphragm air pump that uses standard AC line power taken from a wall outlet will fluctuate with the wall outlet AC power.

A comparison of the example air bed system 300 with the prior air bed system 10, discussed above, was performed. In the comparison, an air pump unit 304 and an AC diaphragm air pump 306 were provided. The air pump unit 304, included the 19.5 V DC power supply 312, main controller 310, and other circuits related to control of the AC diaphragm air pump 306. The main controller 310 included, among other things, the DC motor driver circuit 320 as discussed above with respect to FIG. 3.

The same Hailea diaphragm air pump 16, used in the test discussed above with respect to FIG. 1, was incorporated into the test of an embodiment of the air bed system 300, as the AC diaphragm air pump 306 of FIG. 3 so that the comparison was normalized with respect to the diaphragm air pump. The Hailea diaphragm air pump (in this example "AC diaphragm air pump 306") was connected to receive the OUT1 and OUT2 DC square waveforms of the DC motor driver circuit 320. The DC motor driver circuit 320 was configured to provide the OUT1 and OUT2 DC square wave forms to the 1$^{st}$ and 2$^{nd}$ inputs 334, 336, respectively, to drive the AC diaphragm air pump 306 with both 19.5 V DC square wave forms.

The actual DC square wave forms of OUT1 and OUT2 as measured during operation of the embodiment and are shown in FIGS. 5A and 5B, respectively. The OUT1 and OUT2 waveforms had max operating voltages measured as 20.4 V max and 21.2 V max, respectively. These were not peak-to-peak (p-p) measurements, but merely the max DC voltage measurements of the OUT1 and OUT2 DC waveforms at the H-bridge outputs of the DC motor driver circuit 320. The max voltage variances (i.e., 20.4 V and 21.2V) from the expected 19.5 V maximum output voltages for OUT1 and OUT2 are due to the electromotive force created by movement of the magnet 432 with respect to the coil or winding 332. The max voltage variances may also be due, in part to inductive ringing associated with the coil or winding 332 of the AC diaphragm air pump 306.

FIG. 6 depicts a current graph of a pseudo-AC square waveform 600 measured between OUT1 and OUT2 of the DC motor driver circuit 320 and the 1$^{st}$ input 334 and 2$^{nd}$ input 336 to the AC diaphragm air pump 306. The clipped tips or current peaks 602 and 604 of the pseudo-AC square waveform 600 are created by the current limiting circuitry in the DC motor driver circuit 320. In this embodiment, the maximum current through diaphragm air pump winding 332 is regulated by a current chopping circuit associated with or incorporated in the DC motor driver circuit 320.

The current limiting aspects of the H-bridge outputs of the DC motor driver circuit for driving the AC diaphragm air pump 306, like the dual Hailea diaphragm air pump in this disclosure, can be seen in FIGS. 3, 5A, 5B and 6. While the H-bridge outputs of the DC motor driver circuit 320 are enabled, at time t1, OUT1 is switching from its minimum voltage (e.g., 0 volts) to its maximum voltage (e.g., between about 19.5 V and 20.4 V) and OUT2 is switching from its maximum voltage (e.g., between about 19.5 V and 21.2V) to its minimum voltage (e.g., 0 volts). Between time t1 and t2, while OUT1 maxV voltage and OUT2 MinV voltage is applied to opposite sides of the coil or winding 332.

The extremely fast change or switch of voltage across the coil or winding 332 causes the current between time t1 and t2 to rise very rapidly (i.e., exponentially) through the coil or winding 332. The rate of current change through the winding 332 is dependent on the DC voltage across and the inductance and resistance of the winding 332. Once the current hits the set +Max current or current chopping threshold at time t2, the H-bridge circuit disables the current until a next PWM cycle between time t2 and t3. Thus, the current is limited to a +Max current that is the clipped portion or current peak 602 of the pseudo-AC square waveform 600 between time t2 and t3 and where the MaxV voltage of OUT1 is chopped on and off. At time t3, OUT1 switches from its MaxV to its MinV voltage, while OUT2 switches from its Min V to its Max V voltage.

Then between time t3 and t4, the extremely fast change or switch of voltage to the opposite direction across the winding 332 causes the current between time t3 and t4 to change directions and fall very rapidly (i.e., almost exponentially) through the winding 332. The rate of the current change through the winding 332 continues to increase until the current hits the –Max current threshold or current chopping threshold at time t4. Thus, the current through winding 332 is limited to a –Max current at clipped tip or current peak 604 between time times t4 and t5 and the MaxV voltage of OUT2 is chopped on and off making the chopped signal portion 504. At time t5, the cycle repeats and creates the pseudo-AC square waveform of FIG. 6.

Using this example configuration according to an embodiment of the disclosure, the Hailea air pump, operating as the AC diaphragm air pump 306 inflated the same chamber of an air mattress as the prior art configuration of FIG. 1. In the test of an embodiment of the disclosure with the Hailea air pump driven by two 19.5V square waves at 50 Hz provide by the H-bridge circuitry of the DC motor driver circuit 320, the time required to inflate the same chamber of an air mattress (i.e., the Rapid Air 2-Zone King bed chamber) from 0.30 psi to 0.84 psi was measured to be 45 seconds, half the time required by the prior diaphragm pump configuration of FIG. 1.

It is appreciated that the voltage waveforms OUT1 and OUT2 supplied to the AC diaphragm air pump 306 are modulated (at for example between times t2 and t3, and t4 and t5, chopped signal portions 502 and 504) when the pseudo AC square waveform's current 600 reaches pre-set +/–Max current levels (e.g., +Max current and –Max current) to prevent the AC diaphragm air pump 306 from being over-driven. Further, the microcontroller 324 depicted in FIG. 3 is configurable to provide a 'motor frequency' signal to the DC motor driver circuit 320 to adjust the frequency of the DC voltage square wave forms OUT1 and OUT2. Adjustments to the frequency of the OUT1 and OUT2 DC square waveforms allow the main controller 310 to adjust, select, or provide an optimal air flow rate produced by the AC diaphragm air pump 306. Additionally, a result of adjusting, controlling, and selecting the OUT1 and OUT2 DC square waveform frequency combined with the ability to limit maximum pump current (i.e., +/–Max current) by choosing a DC voltage frequency results in embodiments of the invention to be able to minimize or increase the amount of time between times t2 and t3, and t4 and t5 to be below a predetermined amount of time. Adjustment, control and selection of the OUT1 and OUT2 DC square waveform frequency and the Max current can be used to both increase the pump's airflow efficiency and tune the pump to decrease or minimize the sound level (dB) the diaphragm air pump makes at the increased or other airflow efficiency. It is estimated that an embodiment can have its OUT1 and OUT2 DC square waveform frequency tuned to decrease the sound level (dB) of the diaphragm air pump by from about 1 dB to 15 dB by adjusting the OUT1 and OUT2 DC square waveform frequency between about 45 and 65 Hz.

FIG. 6 depicts a graph illustrating the shape of the current waveform, (i.e., the pseudo-AC square waveform 600) while driving the AC diaphragm air pump 306. The pseudo AC square waveform 600 is derived from measuring the voltage across a current sense resistor 48 (not specifically shown) in series with OUT2 and the $2^{nd}$ input 336 when the AC diaphragm air pump 306 is driven by the OUT1 and OUT2 DC voltage waveforms depicted in FIGS. 5A and 5B. Specifically, FIG. 6 shows the high and low current peaks 602 and 604 where the DC motor driver circuit 320 limits the current.

The high and low current peaks, each correspond to a 2.8A peak current flow (i.e., +Max current peak 602 or –Max current peak 604) through the diaphragm air pump's coil or winding 332. The shape of the pseudo-AC square waveform 600 provides a faster rise and fall time than the sinusoidal wave shape of the input current waveform 102 of FIG. 2. Changing the voltage across the winding 332 so quickly and limiting the current through the winding to maximum positive or negative current flow (+Max current and –Max current) accelerates airflow into and out of the $1^{st}$ and $2^{nd}$ chambers 404, 408 of the diaphragm air pump 400.

Additionally, by being able to adjust the frequency of the OUT1 and OUT2 DC waveforms, the time between t2 and t3 (and t4 and t5) can be adjusted to minimize or optimize the length of time that the current through the winding 332 is at a maximum so as to tune the AC diaphragm air pump 306 to a) maximize the amount of air pumped per cycle, b) minimize the energy used by the diaphragm air pump, and c) decrease the amount of sound (dB) that the diaphragm pump produces during operation.

Table 1 provides a general comparison between use of the prior diaphragm air pump system depicted in FIG. 1 and an example pumping system depicted in FIG. 3 according to an embodiment of the invention. In the comparison both systems incorporated the same Hailea motor-driven diaphragm air pump AP-25.

TABLE 1

| Diaphragm Pump Controller Comparison | | |
|---|---|---|
| | Prior Pump Controller configuration (FIG. 1) | Example Pump Controller Configuration (FIG. 3) |
| Supply Voltage (nominal) | 12.0 V AC sine wave | 19.5 V dual DC square waves 180° out of phase |
| Supply Voltage (variation) | +10%, –15% (determined by power grid) | +6%, –6% (determined by DC power supply) |
| Current Wave Shape | Sine Wave | Pseudo AC Square Wave |
| Current Rise Time | Sinusoidal | Near Exponential |
| Inflation Time (for Rapid Air 2-Zone King Chamber test from 0.30 psi to 0.84 psi) | 90 seconds | 45 seconds |
| Peak Current Controlled by Microcontroller or DC motor driver circuitry | No | Yes |
| Diaphragm Pumping Frequency Controlled by Microcontroller | No | Yes |
| Air Flow Rate Controlled by Microcontroller | No | Yes |

In Table 1, the conventional pump controller 18 provides the Hailea diaphragm air pump 12 VAC (RMS) voltage as a nominal input voltage. The 12 VAC voltage originated as a 120 VAC line voltage from a wall outlet and then was down converted by the transformer 22 to 12 VAC prior to being provided to the Hailea pump. Due to variances between multiple transformers 22 of the same model and standard AC line voltage variance the supply voltage to the diaphragm pump will vary by about +10% to −15% of the AC line voltage. Conversely, in the new pump controller, the 19.5V DC power supply 312 provided a more stable DC voltage that enabled the DC motor driver circuit 320, via the H-bridge circuitry, to provide more stable control of the the 19.5 V dual DC square waves that are 180° out of phase. The example main controller 310 provided OUT1 and OUT2 DC square wave voltages that stay within +/−6% of 19.5 V peak when not connected to the Hailea diaphragm pump.

Another advantage and improvement that the example embodiments provide over the prior pump controller 18, is that instead of the input current waveform 102 being a sine waveform, the novel embodiment of the main controller 310 provides a pseudo-AC square waveform 600 for the current as shown in FIG. 6. The pseudo-AC square waveform 600 is created by using switched H-bridge DC power. Microcontroller control of the switched H-bridge DC power was found to provide more responsive and adjustable control of the Hailea AC diaphragm air pump.

The rapid, near exponential, rise and fall time of the pseudo AC square waveform 600 produces more force and faster movement of the pump diaphragm(s) from a minimum to a maximum chamber size thereby increasing the diaphragm pump's air chamber size over that of the same Hailea AC diaphragm pump driven by a slower rise and fall time sinusoidal waveform. Additionally, the pseudo square waveform 600 can be controlled by the DC motor driver circuit 320 to clip the current at one or more predetermined maximum +/−current values by the H-bridge circuitry.

The clipping of the current peaks 602, 604 of the pseudo AC square current waveform 600 creates chopped signal portions 502, 504 of the DC square waveforms OUT1 and OUT2, which has been found, by adjusting or tuning the chop time (e.g., from time t2 to t3 and time t4 to t5) to enable the Hailea diaphragm pump to operate at noise levels from −1 to 15 dB quieter than prior pump controller configurations providing 12, 120, and 240 VAC at about 50 or 60 Hz to the diaphragm air pump.

Unexpected results occurred when an embodiment of the disclosure inflated a Rapid Air 2-Zone King Chamber mattress from 0.30 psi to 0.84 psi in half the amount of time (45 seconds) compared to the prior diaphragm pump controller of FIG. 1 inflating the same air mattress at a same pump frequency from 0.30 psi to 0.84 psi in 90 seconds.

Additional advantages of controlling an AC diaphragm pump with a DC motor controller circuit that outputs two 180° out of phase DC square waves to drive the AC diaphragm pump is that the DC motor driver circuit 320 can be configured to set or adjust the peak amount of current that can flow through the winding 332 of the diaphragm pump to help protect the diaphragm pump motor winding(s) from being over driven. Conversely, prior AC diaphragm pump configurations, such as those substantially similar to the connection configuration of AC line power to the diaphragm air pump 16 in FIG. 1 have no ability control, adjust, or limit the peak current that flows through the winding 332 of the diaphragm pump increasing the danger of overdriving the diaphragm pump motor.

The comparison testing of the prior diaphragm conventional controller 18 and the embodiments of the main controller 310 made clear that the conventional pump controller 18 was limited to pumping at the set frequency of the line AC voltage, while the microcontroller 324 of the embodiments of main controller 310 could be configured to set or change the diaphragm pumping frequency, which in combination with being able to set the +/−Max current through the pump winding 332, can be used to both (i) control and tune the noise level of the diaphragm pump to a minimum (dB) and (ii) increase and decrease the airflow (1/min) output of the pump to maximize the pump efficiency or regulate an inflation rate of one or more chambers of the air mattress 302.

Furthermore, various diaphragm air pump main controller 310 embodiments are configured to enable the microcontroller 324, via a I/O connections with the DC motor driver circuit 320 and/or the remote interface circuitry 328 or other user interface to control (i) the available current supplied to the diaphragm air pump to not exceed a predetermined or set peak current, (ii) control the operating or pumping frequency of the diaphragm air pump, and/or (iii) control both the pumping frequency and/or the current supplied to the diaphragm air pump to control air flow rate and/or the sound level (dB) of the diaphragm air pump during operation.

It was unexpectedly found that the air flow rate of a diaphragm air pump can be increased significantly by using embodiments of the diaphragm main controller 310 configuration disclosed herein, as compared to the use of an AC voltage sinusoidal waveform, A significant example the embodiment's improvement over the prior conventional controller 18 is the significant decrease of air mattress inflation time from 90 seconds to 45 seconds when using the same diaphragm air pump in the first test of the prior pump controller configuration and then in the example embodiment of the present air bed system 300 for a second test. The shortened air mattress inflation time of embodiments of the present invention is attributable to use of the two 180° out of phase DC square waves, in place of an AC sine wave, to drive the AC diaphragm air pump. Use of the two 180° out of phase DC square waves, was found to significantly increase the overall airflow of the diaphragm pump.

The cause of the increase of overall airflow was due to an increase in overall displacement of the diaphragm pump's air chambers (e.g., $1^{st}$ and $2^{nd}$ chambers 404 and 408 of FIGS. 4A and 4B). The mechanics of the diaphragm pump increases the air chamber's overall displacement while increased frequency of the waveform causes more displacements per second. The pseudo-DC square waveforms' frequency and current that power the diaphragm air pump can be tuned to provide harder or more forceful diaphragm swings or movements from one diaphragm pump oscillation extreme to the other due to the pseudo-AC square wave application across the diaphragm motor winding(s).

The diaphragms are made of flexible and elastic materials which may flex or stretch to both increase the maximum air chamber size and decrease the minimum air chamber size of the diaphragm motor. It was also found that at certain increased frequencies the oscillation mechanics of the pump cannot physically keep up and may have a "stall moment" where the oscillation of the diaphragm pump temporarily stops or stalls for one or more pump frequency cycles. The operating pump frequency at which a stall moment occurs is diaphragm air pump model dependent and discoverable by evaluating a range of frequencies and peak current (i.e., +/−Max current) settings.

Because the microcontroller 324 (e.g., as depicted in FIG. 3) may be used to adjust parameters related to driving the two 180° out of phase DC square waveforms such as waveform frequency or peak current parameters, the AC diaphragm air pump 306 is configurable to be more finely and robustly controlled to adapt to different situations.

In one further example embodiment, pressure readings that correspond to an air mattress chamber being inflated can be read from a pressure sensor within the manifold 308 by the pressure sensor circuitry 326 and made available for the microcontroller 324. The microcontroller can use the pressure sensor readings as feedback to slow down the air pumping operation as the mattress chamber approaches full inflation or higher pressures by decreasing the pump frequency or the +/−Max current amplitude in response to detecting a predetermined pressure level that is approaching a desired inflation pressure setting. This is useful because the rate at which a chamber inflates increases exponentially as the chamber approaches being full of air. Thus, it would be desirable to decrease the inflation rate of a chamber as it nears being full of air by using the pressure sensor readings of the chamber as feedback for slowing and stopping the inflation rate of the air mattress chamber.

Figure 7:
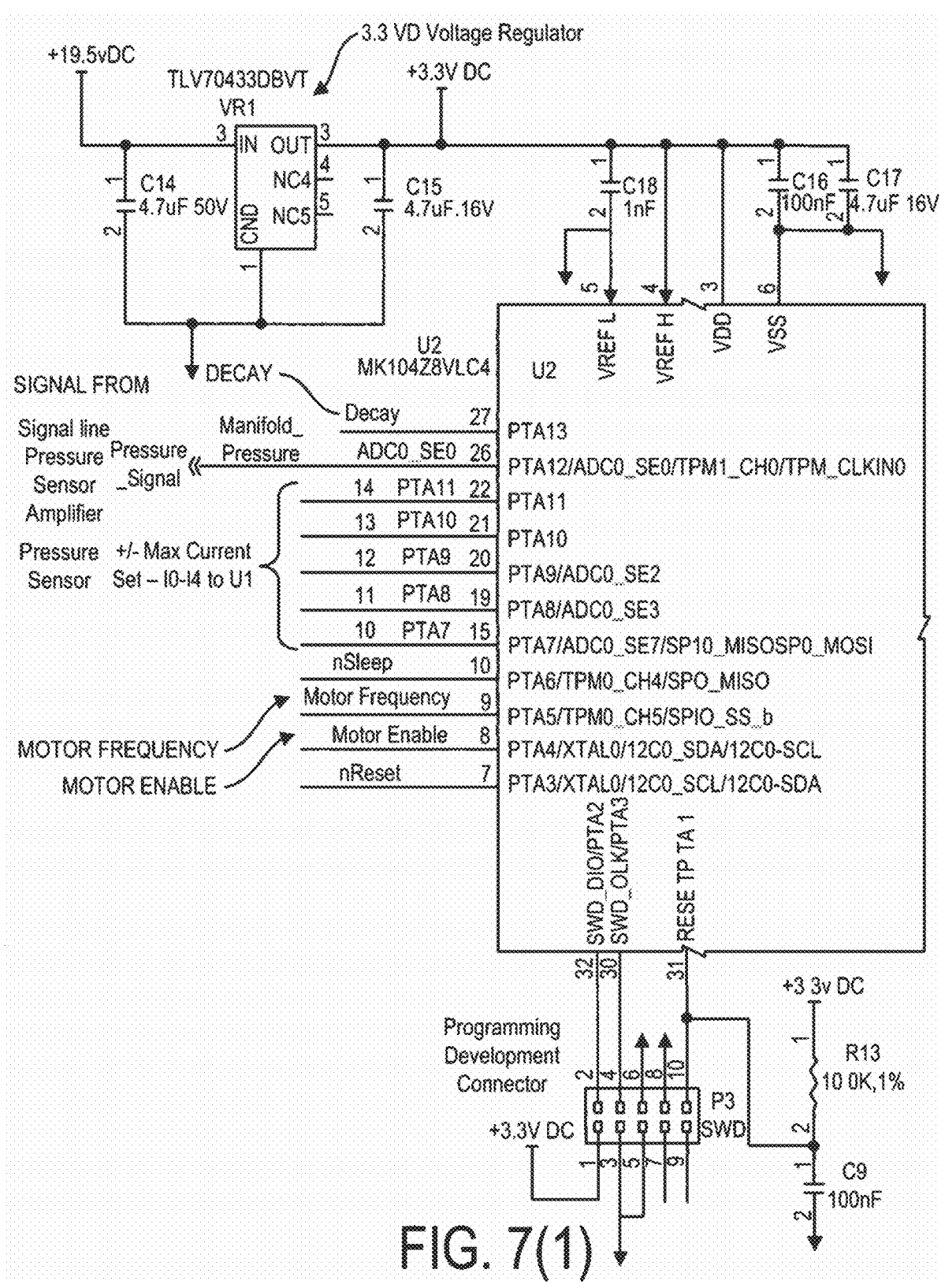
FIGS. 7(1) and 7(2) are a circuit diagram schematic that includes microcontroller circuitry of an embodiment of the invention.
Figure 7:
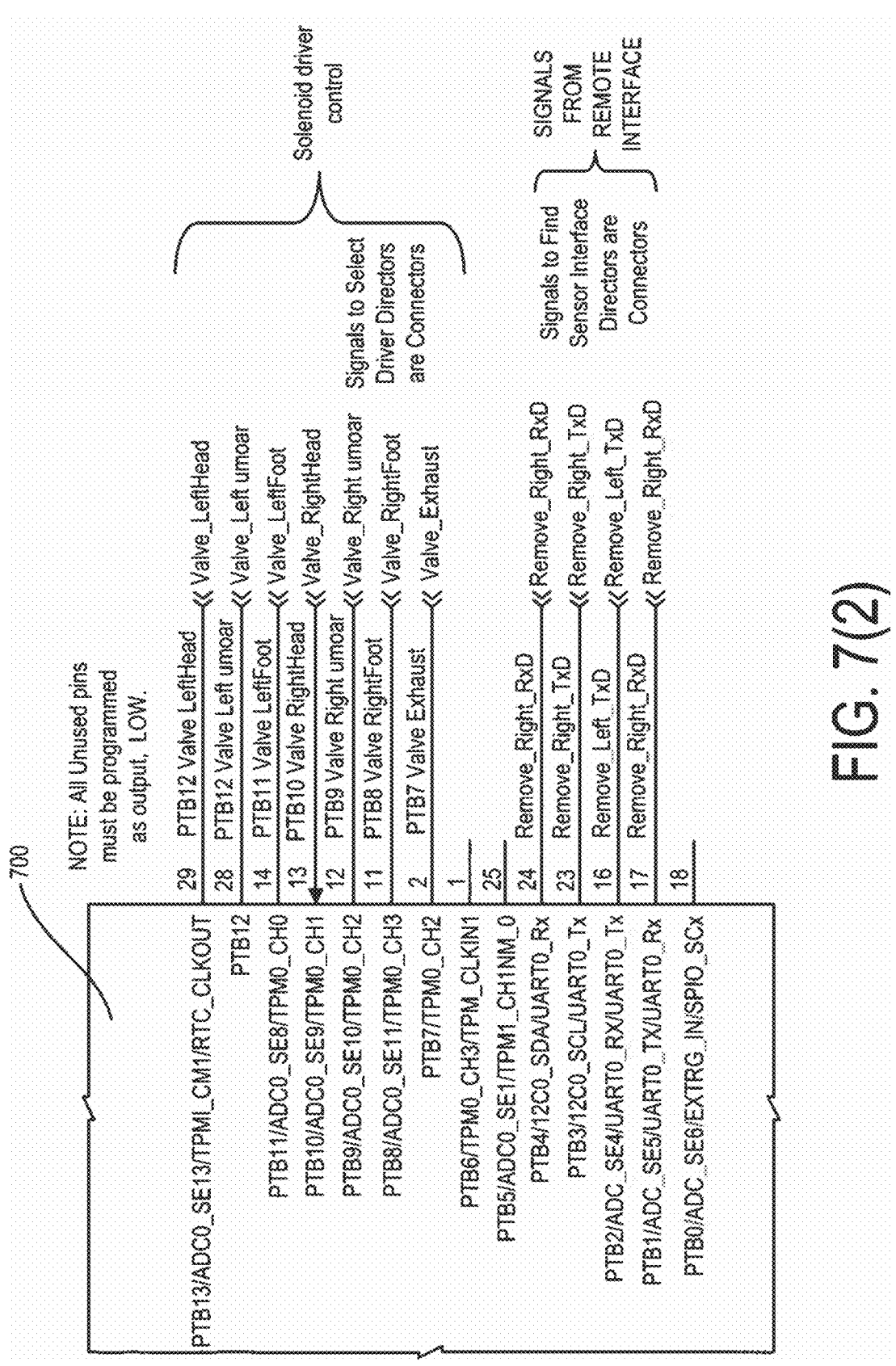

FIG. 7 depicts a circuit diagram of a microcontroller 700 that may be included in the main controller 310 as the microcontroller 324 depicted in FIG. 3. FIG. 8 depicts a circuit diagram of a DC motor driver 800 that comprises H-bridge output circuitry and may also be included as part of the main controller 310 as the DC motor driver circuit 320 depicted in FIG. 3. The DC motor driver 800 is configured to provide two 180° out of phase DC square waveform OUT1 (via pins 5 and 10 of the DC motor driver 800) and OUT2 (via pins 7 and 8 of the DC motor driver 800) directly to the respective 1st and 2nd inputs 334, 336 of the AC diaphragm air pump 306.

Circuits internal to the DC motor driver 800 control the H-bridge transistor switching and can modulate or chop the OUT1 and OUT2 voltages waveforms provided to the to the AC diaphragm air pump 306 (e.g., chopped signal portions 502 and 504 of FIGS. 5A and 5B). Modulation or chopping of the OUT1 and OUT2 voltage waveforms result in clipping of the current peaks (e.g., current peaks 602, 604 of FIG. 6) and maintaining current through the AC diaphragm air pump 306 at less than a preselected peak current value (e.g., +/−Max current value of FIG. 6).

A peak current value that should not be exceeded can be configured by connecting five (5) binary values to the I0-I4 inputs (pins 23-27 of the DC motor driver 800). In various embodiments of this disclosure, the microcontroller 700 can be configured and connected to the DC motor driver's I0-I4 inputs to set and/or change the preselected peak current value (i.e., +/−Max current) through the diaphragm air pump winding 332.

In FIG. 7, the microcontroller has ports PTA7-PTA11 (pins 15,19-22) that can be configured and connected to the inputs I0-I4 of the DC motor driver 800 to set and adjust the peak current (i.e., the +/−Max current) that the H-bridge circuitry will output. If it is determined that the current through the winding 332 is greater than the peak current value set by the DC motor driver inputs I0-I4, then the H-Bridge will modulate and/or clip the OUT1 and OUT2 180° out of phase DC square voltages and current waveforms, respectively OUT1, OUT2, and 600.

The microcontroller 700 can be configured to set, control, and vary the motor frequency (i.e., the oscillation frequency) of the diaphragm air pump by providing a variable frequency square wave from the microcontroller's port PTA5 (pin 9) to the DC motor driver's phase input (pin 20). The variable frequency square wave provided by the microcontroller 700 controls the frequency and period of the square waveforms to be output by the H-bridge as OUT1 and OUT2.

The microcontroller 700 can further be configured to enable or disable the H-bridge circuitry portion of the DC motor driver 800. When the H-bridge is enabled, the H-bridge circuit will produce OUT1 and OUT2 DC square waveforms for use by the diaphragm air pump. When the H-bridge circuitry is not enabled, the OUT1 and OUT2 outputs are held at a high impedance provided that the decay input (pin 19) of the DC motor driver 800 is held high. Thus, in various embodiments, port PTA4 (pin 8) of the microcontroller is configured to enable or disable the diaphragm air pump by providing an enable or disable signal to the enable input (pin 21) of the DC motor driver 800. In various embodiments, the microcontroller is configured to receive a pump on/off signal from the remote interface circuitry 328 to enable a user to control the diaphragm air pump remotely via a user interface.

The DC motor driver 800 includes a current sense connection ISENA and ISENB (collectively ISEN) which are both connected to a ground node of the H-bridge circuit inside the DC motor driver 800 (not shown). The current going to ground from the H-bridge circuitry (i.e., all the current going to ground from the diaphragm air pump winding) goes to ground 802 from the current sense connection ISEN through the current sensing resistor R1. When the H-bridge is enabled and providing the two 180° degree out of phase DC square waves OUT1 and OUT2 to the opposite sides of the coil or winding 332, the H-bridge's transistors switch such that the + or − current direction through the H-Bridge goes to ground via the ISEN connections.

The + and − currents will go through the current sensing resistor R1 and produce a respective value of +Max or absolute value of −Max voltage drop across the current sensing resistor to ground 802. The + and − voltage drop across the current sensing resistor R, which is sensed by the ISEN input. When the absolute value of the +/−voltage drop across the current sensing resistor R1 is greater than a predetermined or set ISEN max voltage that corresponds to a predetermined or set max current through the winding 332 of the AC diaphragm air pump 306, then the H-bridge modulates or chops the OUT1 or OUT2 DC waveforms (see, chopped signal portions 502 and 504 of FIGS. 5A, 5B). The modulating or chopping of the OUT1 or OUT2 DC waveforms clips or limits the +/−current through the winding to be less than the set +/−Max current.

While various embodiments have been described above, they have been presented by way of example only, and not as a limitation. For example, any of the elements associated with the air bed system 300 (FIG. 3) may employ any desired functionality set forth herein. Thus, the breadth and scope of a preferred embodiment should not be limited by any of the above-described example embodiments. Further, the example embodiments of this disclosure are described with reference to illustrations, various modifications, or adaptations of the methods and/or specific structures or configurations. As such it may become apparent to those skilled in the art to employ such variations as appropriate and/or to practice the invention in manners otherwise than as specifically described herein. Accordingly, this disclosure includes all modifications and equivalents of the subject matter recited in the claims appended hereto as permitted by applicable law. Moreover, any combination of the above-described elements and possible variations thereof are encompassed by the invention unless otherwise indicated herein or otherwise clearly contradicted by context.

The herein-described components and functions can be comprised of instructions that are stored on a computer or microcontroller's readable storage medium. In the case of a microcontroller, the microcontroller readable storage medium may be integrated circuitry that integral or included as part of the microcontroller circuit, chip, or chip package. The instructions can be retrieved and executed by a processor (e.g., microprocessor, microcontroller, reasonable facsimile, or derivation thereof). Some examples of instructions are software, program code, and firmware. Some examples of a storage medium are memory devices, tape, disks, integrated circuits, and servers. Instructions are operational when executed by the processor to direct or configure the processor to operate in accord with the invention. Those skilled in the art are familiar with instructions, processor(s), and storage medium.

The invention claimed is:

1. An air pump unit comprising:

an AC diaphragm air pump comprising a winding having a first AC power connection at a first end of the winding and a second AC power connection at a second end of the winding; and a DC motor driver circuit configured to provide an OUT1 signal to the first AC power connection and an OUT2 signal to the second AC power connection, wherein the OUT1 and OUT2 signals are each DC square waveforms having a frequency that corresponds to a desired motor frequency setting, and wherein each of the OUT1 and OUT2 DC square waveforms are 180 degrees out of phase.

2. The air pump unit of claim 1, wherein the DC motor driver circuit further comprises an OUT1 and OUT2 current limiting circuit that limits the current provided by the OUT1 and OUT2 signals to the winding to be less than an absolute value of a +/−Max current setting.

3. The air pump unit of claim 2, wherein the OUT1 and OUT2 signals current limiting circuitry is configured to regulate the current provided by the OUT1 and OUT2 signals by chopping the respective OUT1 or OUT2 signals that is providing current to the winding that is greater than or equal to the absolute value of the +/−Max current setting.

4. The air pump unit of claim 1, wherein the DC motor driver circuit is configured to provide at least one of decay mode functionality and ramp stop functionality.

5. The air pump unit of claim 1, wherein the DC motor driver circuit further comprises a pressure sensor functionality.

6. The air pump unit of claim 1, wherein the AC diaphragm pump is a double diaphragm pump.

7. An air bed system comprising:

an air mattress having at least one chamber; and an air pump unit that is operably attached to the air mattress, wherein the air pump unit comprises:

an AC diaphragm air pump comprising a winding having a first AC power connection at a first end of the winding and a second AC power connection at a second end of the winding; and a DC motor driver circuit configured to provide an OUT1 signal to the first AC power connection and an OUT2 signal to the second AC power connection, wherein the OUT1 and OUT2 signals are each DC square waveforms having a frequency that corresponds to a desired motor frequency setting, and wherein each of the OUT1 and OUT2 DC square waveforms are 180 degrees out of phase.

8. The air bed system of claim 7, wherein the DC motor driver circuit further comprises an OUT1 and OUT2 current limiting circuit that limits the current provided by the OUT1 and OUT2 signals to the winding to be less than an absolute value of a +/−Max current setting.

9. The air bed system of claim 8, wherein the OUT1 and OUT2 current limiting circuitry is configured to regulate the current provided by the OUT1 and OUT2 signals by chopping the respective OUT1 or OUT2 signal that is providing current to the winding that is greater than or equal to the absolute value of the +/−Max current setting.

10. The air bed system of claim 7, wherein the DC motor driver circuit is configured to provide at least one of decay mode functionality and ramp stop functionality.

11. The air bed system of claim 7, wherein the DC motor driver circuit further comprises a pressure sensor functionality that is capable of measuring pressure in the air mattress.

12. The air bed system of claim 7, wherein the AC diaphragm air pump is a double diaphragm pump.

13. A method of operating an air pump unit comprising:

providing an AC diaphragm air pump comprising a winding having a first AC power connection at a first end of the winding and a second AC power connection at a second end of the winding; and using a DC motor driver circuit, providing an OUT1 signal to the first AC power connection;

using the DC motor driver circuit, providing an OUT2 signal to the second AC power connection;

wherein the OUT1 and OUT2 signals are each DC square waveforms having a frequency that corresponds to a desired motor frequency setting, and wherein each of the OUT1 and OUT2 DC square waveforms are 180 degrees out of phase.

14. The method of operating an air pump unit of claim 13, and further comprising limiting a current provided by the OUT1 and OUT2 signals to the winding to be less than an absolute value of a +/−Max current setting using an OUT1 and OUT2 current limiting circuit on the DC motor driver circuit.

15. The method of operating an air pump unit of claim 14, and further comprising regulating the current provided by the OUT1 and OUT2 signals by chopping the respective OUT1 or OUT2 signal that is providing current to the winding that is greater than or equal to the absolute value of the +/−Max current setting using the OUT1 and OUT2 current limiting circuitry.

16. The method of operating an air pump unit of claim 13, and further comprising providing at least one of decay mode functionality and ramp stop functionality using the DC motor driver circuit.

17. The method of operating an air pump unit of claim 13, and further comprising sensing pressure using the DC motor driver circuit.

18. The method of operating an air pump unit of claim 13, and further comprising sensing sound proximate the AC diaphragm pump using the DC motor driver circuit.

19. The method of operating an air pump unit of claim 13, wherein the AC diaphragm pump is a double diaphragm pump.

20. The method of operating an air pump unit of claim 13, and further comprising:

operably attaching the AC diaphragm pump to an air mattress; and using the AC diaphragm pump to fill the air mattress with air.

* * * * *